US006287671B1

(12) United States Patent
Bright et al.

(10) Patent No.: US 6,287,671 B1
(45) Date of Patent: Sep. 11, 2001

(54) COMPUTER CONTROLLED LABELING MACHINE FOR APPLYING LABELS INCLUDING STRETCH LABELS AND TACTILELY SENSIBLE INDICIA ON ARTICLES

(75) Inventors: Lyn E. Bright; Syatoboi Otruba, both of Ceres, CA (US)

(73) Assignee: B & H Manufacturing Company, Inc., Ceres, CA (US)

(*) Notice: Subject to any disclaimer, the term of this patent is extended or adjusted under 35 U.S.C. 154(b) by 0 days.

(21) Appl. No.: 09/229,504

(22) Filed: Jan. 12, 1999

Related U.S. Application Data

(63) Continuation of application No. 08/835,871, filed on Apr. 8, 1997, now Pat. No. 5,858,143, which is a continuation of application No. 08/484,154, filed on Jun. 7, 1995, now abandoned.

(51) Int. Cl.$^{7}$ .......... B32B 27/14

(52) U.S. Cl. .......... 428/195; 428/195; 156/86; 156/84

(58) Field of Search .......... 156/456, 458, 156/457, 444, 494, 84, 86; 215/230, 224, 534; 428/195, 34.4, 35.1, 42.1, 199, 204

(56) References Cited

U.S. PATENT DOCUMENTS 4,923,557 * 5/1990 Dickey .......... 156/86
5,011,032 * 4/1991 Rollman .......... 215/230
5,251,758 * 10/1993 Kolacek .......... 206/542

* cited by examiner

*Primary Examiner*—Merrick Dixon
(74) *Attorney, Agent, or Firm*—Lariviere, Grubman & Payne, LLP

(57) ABSTRACT

A computer controlled labeling apparatus having a label applying mechanism for applying labels to containers. The labeling apparatus has a motor for driving a container transport and a sensor for providing transport status information to a controlling computer. The apparatus contains at least one labeling station. Each labeling station also has a motor and a sensor, the motor drives the labeling station and the sensor provides labeling station status information to the controlling computer. The computer is programmed to process status information in conjunction with prestored information relating to the characteristics of the labeling apparatus, containers, and desired labeling and generated suitable control signals for labeling apparatus operation. Computer control for the application of stretch type label material from a continuous web of material is described. The computer controlled application of liquid material, such as a settable viscous adhesive to label material during application of the label to form a tactilely sensible indica, such as braille marking is also provided.

5 Claims, 18 Drawing Sheets

COMPUTER CONTROLLED LABELING MACHINE FOR APPLYING LABELS INCLUDING STRETCH LABELS AND TACTILELY SENSIBLE INDICIA ON ARTICLES

This is a continuation of application Ser. No. 08/835,871 filed Apr. 8, 1997, now U.S. Pat. No. 5,858,143, which is a File Wrapper Continuing application of application U.S. Ser. No. 08/484,154 filed Jun. 7, 1995 now abandoned.

BACKGROUND OF THE INVENTION

In a turret type of labeling machine such as that described in U.S. Pat. No. 4,108,709 and incorporated herein by reference, containers are supplied continuously to a rotating turret; each container, in turn, is clamped between an upper chuck and a lower chuck carried by the turret; the container, so clamped, is rotated orbitally about the central shaft of the turret to a label pick up station where it contacts the leading edge of a label carried by a label transport such as a rotating vacuum drum; the label is released from the vacuum drum and is wrapped around a container as the container is caused to spin about its axis; and with a label wrapped around, it is transported by the turret to a container release station where the labeled container is released from the turret. In this operation, it is necessary to rotate each container clamped between a pair of chucks orbitally about the axis of the turret and it is necessary to spin the container about its own axis to wrap a label about it. Other labeling machines are known, such as for example, that described in U.S. Pat. No. 4,242,167 entitled "Labeling Machine" which is hereby incorporated by reference.

In the aforesaid U.S. Pat. No. 4,108,709 the spinning of the container is achieved by, for example, a wheel fixed to and coaxial with the upper member of a pair of chucks and a pad which is concentric to the turret axis. The contact between this wheel and pad causes the respective chuck, and with it the container, to spin.

This means of spinning the containers is quite effective but is limited in many ways. For example, the container can spin in only one direction and its speed is fixed by the speed of the turret and by the radius of the wheel and the pad. Also, this method of spinning the container to wrap the label may be ineffective for containers having generally noncircular cross sections.

The invention also relates to the application of stretch labels to containers and other articles. It is common practice to apply labels to containers and other articles by supplying a continuous length of label material from a roll, cutting it into suitable lengths which are transferred to a rotating vacuum drum which picks up each label in turn on its cylindrical surface by means of vacuum and transports each label to a label applying station where it is wrapped around a container. For the purpose of adhering the label to the container, glue is applied to the container and/or to the label, usually the latter, at its leading end and at its trailing end. An adhesive may be formed in situ by the use of a solvent. Also heat sealing of the overlap between the trailing end of the label of the leading end of the label may be employed.

Hereinbelow for convenience the term "label" or "labels" and the term "container" will be used, but it is to be understood that other segments of sheet material may be applied, e.g., for decorative purposes, identification bands, tamper evident strips, etc. and that other articles than containers may have labels or other segments of sheet material applied to them.

Such label application to containers may be carried out with a stack of precut labels rather than severing labels from a continuous length of label material.

Representative patents relating to such label application are U.S. Pat. Nos. 4,108,709; 4,108,710; 4,500,386; 5,091,040; 5,137,596 and 5,269,864. Such label application may also be carried out and is often carried out with a heat shrinkable label material which, after application to the container, is subjected to heat to cause it to shrink, e.g., into a recessed area of a container or onto contoured portions such as the neck or shoulder of a container. For example in U.S. Pat. No. 4,704,173 such heat shrink labeling is illustrated by application of a label to a container having a cylindrical body above and below which are portions of the container which are of lesser diameter. The heat shrinking shrinks the label onto such areas of lesser diameter.

An alternative to such heat shrinking/contour labeling is the application of stretchable labels, which are stretched before application and which, after application, contract and closely adhere to the recessed and/or contoured portions of the container. An example of such stretch labeling and the method and machinery for accomplishing it is provided by Automatic Label Systems of Twinsburg, Ohio, who supply what are called "Auto-Sleeve® stretch sleeve labels." The Auto-Sleeve® labels are first formed into sleeves. The sleeves have a diameter less than the maximum diameter of the container to which they are to be fitted and the sleeve is stretch fitted over the container and when so applied it contracts and relaxes to fit the container tightly. This method avoids the need to use glue, heat or solvent to adhere the label to containers and it avoids the need to heat the label on containers to shrink the label material onto the container.

However that method requires first forming the stretch label material into a sleeve, then fitting the sleeve over the container. Other than in sleeve technology, the stretching of labels has heretofore been avoided or minimized.

Providing braille characters, icons, or other tactilely sensible indicia on containers allows visually impaired persons to ascertain the contents of packages or containers. Conventional containers have been developed which have a braille or indicia molded therein as part of the container manufacturing process. In addition, the indicia may be directly stamped on the container.

Applying braille markings at the time of printing presents problems due to the difficulties that would be encountered at the point of application. Cut and stacked labels having braille or indicia have a tendency toto nest and thus stick together as each label is pulled out consecutively one at a time during application of the labels to the container or article. In the case of a continuous roll having braille or other indicia, the roll itself would be lop-sided due to the indicia. Such a roll would then encounter difficulties during such process as precision winding and/or unwinding. The problem may be particularly acute when the indicia are formed on stretchable label material.

Accordingly, there is a need to provide a method and apparatus for applying tactilely recognizable indicia to containers at production speeds which overcome the deficiencies of prior known methods and apparatus for applying such indicia to containers or articles.

It is an object of the present invention to provide a more versatile means of operating such a turret type of labeling machine.

It is a further object of this invention to provide a method and apparatus for applying braille indicia to labels at productions speeds.

It is a further object to provide a method and apparatus wherein a continuous roll of label material is marked with TACTILELY sensible indicia with labels being cut from the roll and applied to the containers.

It is yet another object to use an adhesive applying apparatus to apply glue droplets in a controlled and predetermined pattern on the surface or reverse side of a label to produce tactilely sensible indicia.

It is another object of the present invention to provide a method and machinery which will apply stretch labels in sheet form, as for example in U.S. Pat. No. 4,500,386 or U.S. Pat. No. 4,108,709, and to apply the labels in stretched condition without the need to preform a sleeve.

It is yet a further object of the invention to provide computer control and synchronization of the label handling apparatus to achieve the afore described labeling objectives.

SUMMARY OF THE INVENTION

The difficulties and limitations mentioned above are greatly diminished by providing a computer controlled turret type labeling apparatus for controlling the label applying mechanism when applying labels to containers. The computer controlled turret type labeling apparatus has a motor driven turret within a container handling station and one or more sensors that provide information about the operational status of the turret. Each container handling station has a motor for driving the container handling station and one or more sensors that provide operational status information about the container handling station. A label applying mechanism such as a motor driven vacuum drum may also be provided having sensors to provide operational status information. A computer is coupled to the motors and sensors for processing the status information received and for generating control signals in response to the received signals to drive the motors and to effect correct labeling of containers. The sensors typically provide speed, direction and position information. The computer is programmed to process the status information in conjunction with prestored information, including information relating to the characteristics of the labeling apparatus, the size and shape of the containers, and the desired container labeling characteristics.

In another aspect of the invention, an apparatus and method are provided for identification by visually impaired persons. The method comprises providing a sheet or web of material, preferably, having printed matter on one side for use as a label. A tactilely distinguishable mark is then provided on a portion of the sheet or web for identifying packages to the visually impaired by touch. The sheet of material is applied to the article such as a container for example or becomes part of the article. The step of providing the tactilely distinguishable mark may include applying a glue pattern to the sheet. The glue pattern may be applied either on the side of the label containing the printed matter, or else, on the opposite side adjacent the article producing bumps or ridges on the label, which is preferably formed of a lightweight film or paper. Alternatively, the sheet of material may be stamped, embossed to produce ridges, or punched to produce depressions. Further, it is possible to directly apply the glue pattern to the product without utilizing a separate label material. By applying the computer control methods and apparatus to the container and label handling apparatus and to apparatus for applying the glue to a label or directly to the container greater precision is obtained in applying the mark and in locating the mark on the container, a particular advantage when applying braille indicia to sight impaired individuals who otherwise may have difficulty locating the braille indicia.

In another aspect of the invention, method and apparatus for applying stretch label material are provided. Stretch label material, e.g., stretchable polyethylene is supplied continuously to a cutting instrumentality such as that shown in U.S. Pat. No. 4,181,555 and each label, after it passes through the cutter and before it is cut into an individual label is supplied to a rotating vacuum drum and its leading end is placed on the rotating vacuum drum, which grips the label by vacuum. Alternatively, but less desirably, precut labels are fed from a stack of the same to a vacuum drum, as for example in U.S. Pat. No. 4,978,416, likewise being gripped by the vacuum of the vacuum drum. In either case the peripheral speed of the drum is controlled, such as by using computer control techniques as described, so that the peripheral speed of the drum exceeds the linear speed of the label web or sheet arriving at the drum prior to application to the container. In the absence of a sufficiently high vacuum this would lead to slippage of the label on the vacuum drum. However, by using a sufficiently high vacuum this slippage is avoided. Hence the label is held firmly on the drum by vacuum and by reason of the fact that the peripheral speed of the drum is controlled to be greater than that of the label feed through the cutting instrumentality, the label is stretched. Alternatively the leading end of the label may be clamped onto the vacuum drum, e.g., as described in Eder U.S. Pat. No. 5,116,452. The combined use of a clamp and a vacuum strong enough to hold the label against slippage may also be employed.

The label thus held in stretched condition on the drum is then contacted, e.g., at the leading end and at the trailing end by a glue applicator which applies glue to the leading end and to the trailing end so that when the label is wrapped around the container it is adhered thereto. Also the use of a solvent applied to the label and absorbed by the label to form an adhesive in situ may be employed. Alternatively also heat sealing of the ends of the label together may be accomplished as for example in U.S. Pat. No. 5,137,596.

The problem of relaxation of the label from its stretched condition when it is released from the vacuum drum may be dealt with as follows. The adhesive applied to the leading end of the label to adhere it to the container may be an adhesive which bonds very quickly and strongly to the label and to the container, such that it prevents or minimizes relaxation of the label as it leaves the vacuum drum and bonds to the container. Examples of such adhesives are provided below. Alternatively, or in conjunction with the use of such an adhesive, the adhesive may be applied as a series of dots spaced lengthwise along the label or around the periphery of a container. Thus the first dot or array of dots of adhesive near the leading end of the label will be followed by a dot or array of dots spaced a short distance from the first dot or array, etc. Therefore the label will be held firmly on the container as each segment comes off of the vacuum drum and it is prevented from relaxing or the relaxation of the label is not significant.

Adhesive may be applied to the container rather than the label or it may be applied to both the container and the label. In U.S. Pat. No. 3,834,963 adhesive application to the container is shown. The adhesive application to the container may be (as in U.S. Pat. No. 3,834,963) applied to both the container and the label, and the pattern of adhesive applied to the container may vary. For example, a line of adhesive may be applied to the container for adhesion to the leading end of the label, or it may be applied both to the leading end and to the trailing end of the label, or it may be applied to the entire circumference of the container as a succession of dots.

Hereinabove "dots" of adhesive have been referred to and as stated in connection with application to the label, adhesive may be applied as bands or strips to the container and/or to the label.

The labeled container is then removed from the label applying equipment. That portion or those portions of the stretched label overlying a recessed surface or surfaces of the container will shrink onto the recessed portion or portions.

If there is a recessed area on the container which is of a magnitude such that the relaxation of the label will not suffice, e.g., in the case of a deep groove in a container intended as a fingerhold, a heat shrinkable label may be employed assisted if need be by perforations overlying such deeply recessed area or areas to release air trapped between the label and the container. Heat is applied to shrink the label onto or into such deeply recessed area or areas.

Instead of employing a greater peripheral speed of the vacuum drum to stretch the label, the container may be controlled in a manner that causes it to spin at a peripheral speed which is greater than that of the vacuum drum, thereby stretching the label. The peripheral speed of the container is the composite of the speed at which it is caused to spin, its diameter and the speed at which it travels after first making contact with the label. The difference in speed of the label while on the drum and this composite speed can be governed quite precisely by gears or by computer controlled motors as described in greater detail below. To prevent the label from slipping on the container due to its greater peripheral speed, an adhesive which bonds strongly and quickly may be used. Alternatively (and/or in addition to such procedure), adhesive may be applied as a succession of dots so that the label is adhered to the container, not at one point but at several points.

The label may also be stretched by both procedures, that is by operating the vacuum drum at a peripheral speed greater than the label feed and by also causing the container to spin at a composite speed greater than the peripheral speed of the vacuum drum.

Stretch labels having conventionally printed indicia, as well as braille indicia for sight impaired individuals may be employed.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

The following relatively detailed description is provided to satisfy the patent statutes. However, it will be appreciated by those skilled in the art that various changes and modifications can be made without departing from the invention. The following description is exemplary, rather than exhaustive.

Figure 1:
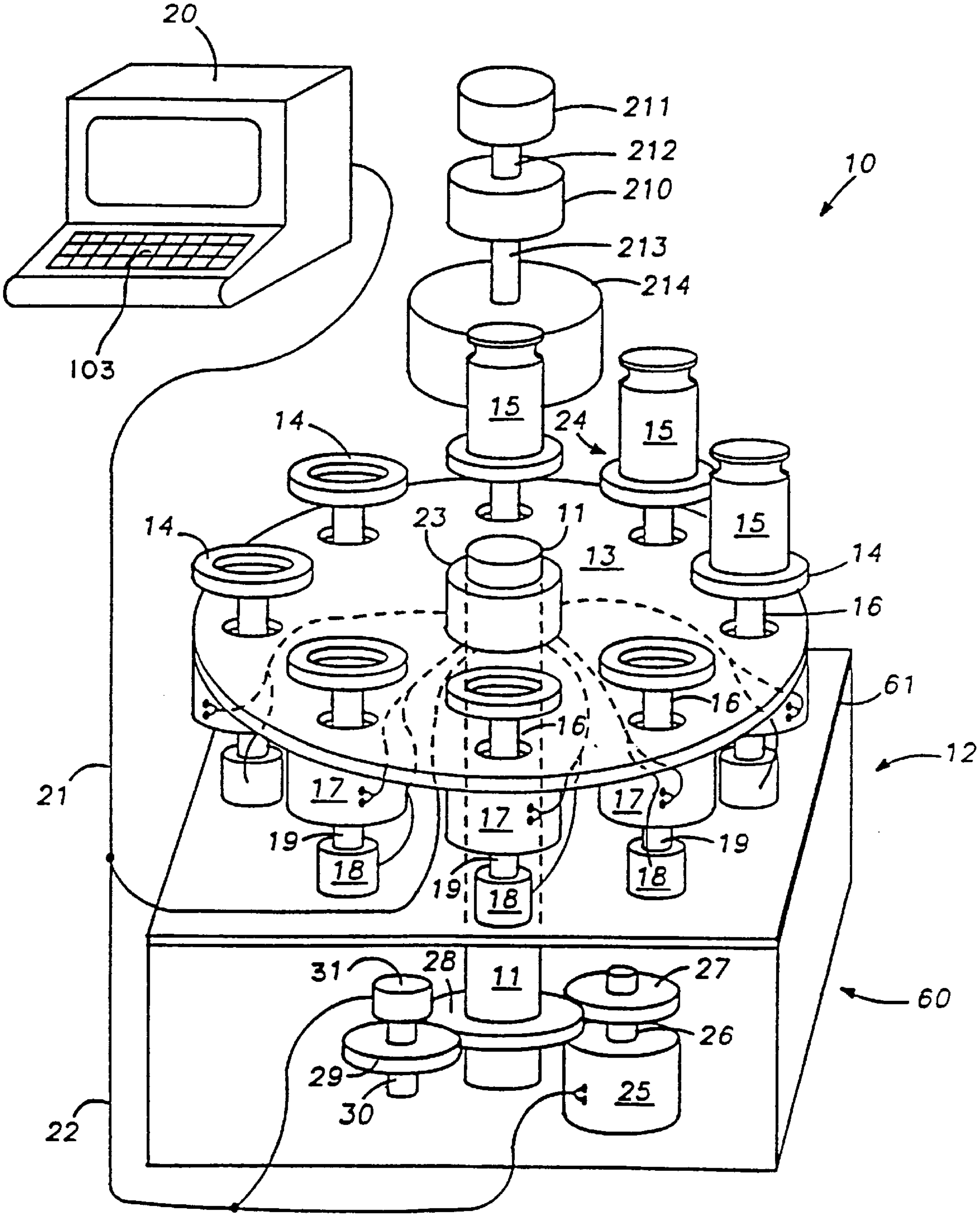
FIG. 1 is an illustration showing a perspective view of a turret arrangement of the preferred embodiment showing only the set of lower chucks.

Referring now to FIG. 1, the lower portion of a labeling turret 10 is shown. The labeling turret 10 is driven by shaft 11 mounted in the frame/housing 12 of the machine and is fixed to a plate 13. While a circular turret 10 is illustrated, a variety of container transports may be used in conjunction with this invention. For example, a linear transport or a transport defining a different predefined path may be used. A plurality of lower chucks 14 are provided which are spaced angularly about shaft 11 and each of which supports a container or other object such as shown at 15 between a container pick up station, where each container is sequentially associated with one of the plurality of chucks 14, and a container release station, where the association ends. Each chuck is fixed to a shaft 16 which is driven by a chuck motor 17. A sensor 18 is mounted to each motor 17 by a coupling 19. Sensor 18 as well as other sensors to be identified herein, may for example be encoders, of which various types are known in the art, or other types sensors. The shaft 16 may be coextensive with coupling 19. The function of chuck sensor 18 is described hereinafter.

There is an upper chuck (not shown) for each of the lower chucks 14 which is in axial alignment with the respective lower chuck. There are suitable container in feed and out feed means to introduce containers into the turret and to remove them from the turret after they have been labeled; and suitable label transport means are provided to supply labels to each container at a label release/applying (label application) station. Such means are described, for example, in U.S. Pat. No. 4,108,709. A simple embodiment of a vacuum drum 214 for holding a label 36 is shown. The vacuum drum 36 is connected by a drum shaft 213 to a drum motor 210 and a drum sensor 211. The vacuum drum, associated adhesive application device 201, and a label cut-off device comprise the labeling application station. The vacuum is provided by a suitable vacuum pump (not shown). Also, means are provided to move the upper of each pair of upper and lower chucks away from the lower chuck to permit entry of a container and downward movement to clamp the container in place between the upper and lower chucks. Suitable cam means for such function is described in U.S. Pat. No. 4,108,709, which also serves to lift each upper chuck to release a labeled container. A sensor and actuator arrangement capable of sensing upper chuck position and moving the upper chuck accordingly, may also be provided. The sensor and actuator arrangement would be similar to that discussed below with respect to turret 10 and modified as appropriate. The actuator may generally be an electric motor or air cylinder of which there are various types.

The turret shaft 11 is driven by an electric motor 25 through motor shaft 26, motor gear 27 and turret gear 28. A turret sensor 31 is also coupled to the turret shaft 11 opposite motor 25. A sensor gear 29 mounted through sensor shaft 30 to the sensor 31 is coupled to turret gear 28.

The motor 25 rotates the turret about the axis of shaft 11. Each chuck motor 17 rotates a chuck 14. During labeling, it is desirable to control the orbital speed of the turret 13, and thereby the orbital speed of the chucks 14 about the axis of the main shaft 11. It is further desirable to control the speed and direction of rotation of each chuck 14 about its own axis. For example, assuming that the turret 13 is rotating counterclockwise, it may be desirable to rotate the turret 13 at a higher or lower speed, to spin a chuck 14 faster or slower, to spin a chuck 14 clockwise or counterclockwise and to commence and arrest spinning motion of a chuck 14 completely. It is generally desirable to commence spinning of each chuck 14 before its container touches the leading end of the label so as to match the linear speed of the label and the surface speed of container at point of contact, and in some applications to assure that the label is placed precisely in reference to a certain mark or feature of said container.

Figure 2:
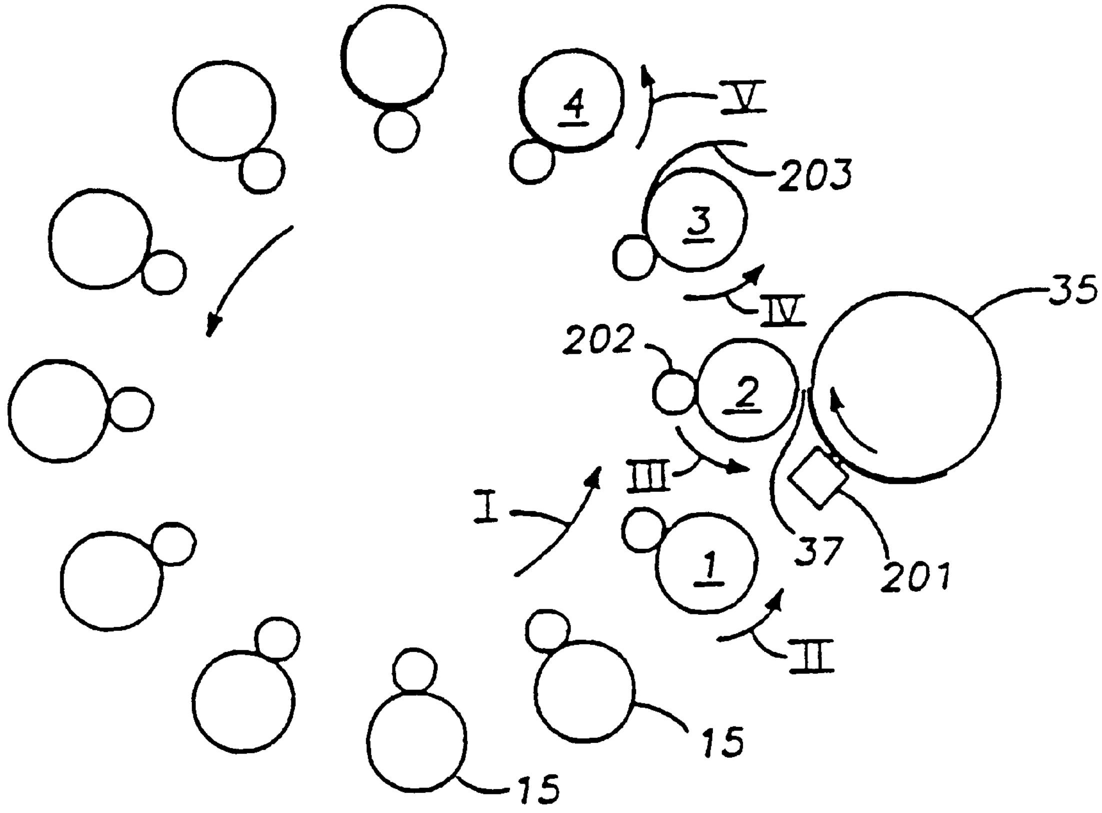
FIG. 2 is an illustration showing a diagrammatic view of one mode of operating such a turret.

Referring now to FIG. 2, four numbered containers are shown which are numbered 1, 2, 3 and 4 and which are transported by the turret 10. A vacuum drum is shown at 35 with a label 36 held on its cylindrical surface by vacuum, such label having its leading edge 37 touching container 2 at a tangent point. An adhesive is applied to portions of label 36, by an adhesive station 201. It is desirable to minimize slipping between the surface of the container 15 and the label carrying vacuum drum 35 during contact. As container 1 approaches the labeling station its motor 17 is commanded so that when it reaches the position as for container 2 it will be caused to spin by its motor 17 at a speed such that its orbital velocity about the axis of main shaft 11 (indicated by arrow I) and its spin velocity (indicated by arrow III) causes it to move forwardly at the same speed or slightly faster, and in the same direction as the label; that is to say, the velocities at the line of tangency of the container and the leading edge of the label are equal or slightly different for maintenance of proper tension. By this means, slippage between the leading edge of the label and the container is avoided or precisely controlled.

Referring to FIG. 2, container 3 has left contact with the vacuum drum and a loose, or what is known as a "flagging" or trailing end of the label 203 is being wrapped around a container. It is desirable that the flagging end be as short as possible to avoid interfering with labeling the next following container 2. Also, it may be desired to pack the chucks 14, and consequently the containers 15, as close together as possible. To achieve these goals motor 17 of the respective chuck 14 may be commanded so that container 3 will be caused to spin faster than container 2, at least until label wrapping is completed as shown by the container at position 4. The command may be for a specified period of time or for a specified number of rotations of the container. Once the label has been completely applied, the motor 17 may be commanded to decelerate or stop the rotation of the container. The control algorithm and coordination with the motors and sensors is described subsequently. An idler cylinder or alternatively a linear wiping arm, or other pressure applying device 202 may also be brought into contact with the spinning container 3 to springably press the label 36 into adhesive contact with the container 3. The idler cylinder 202 may be incorporated in conjunction with each chuck 14 as shown, or as a single station associated with each vacuum drum 35. The need for such an additional pressure applying device will depend on such factors as the type of adhesive, the diameter of the container, and the labeling material. Other methods of pressing the label with adhesive to the surface of the container may also be used, for example an appropriately directed flow of air may be directed at the container to urge the label to the container surface.

While it is generally desirable to match the linear speed of the container and the label at the point of tangent contact, it may alternatively be desired to spin container 2 at a speed such that the tangent velocity of the container exceeds that of the label on the drum, thereby exerting a pull on the label.

Figure 3:
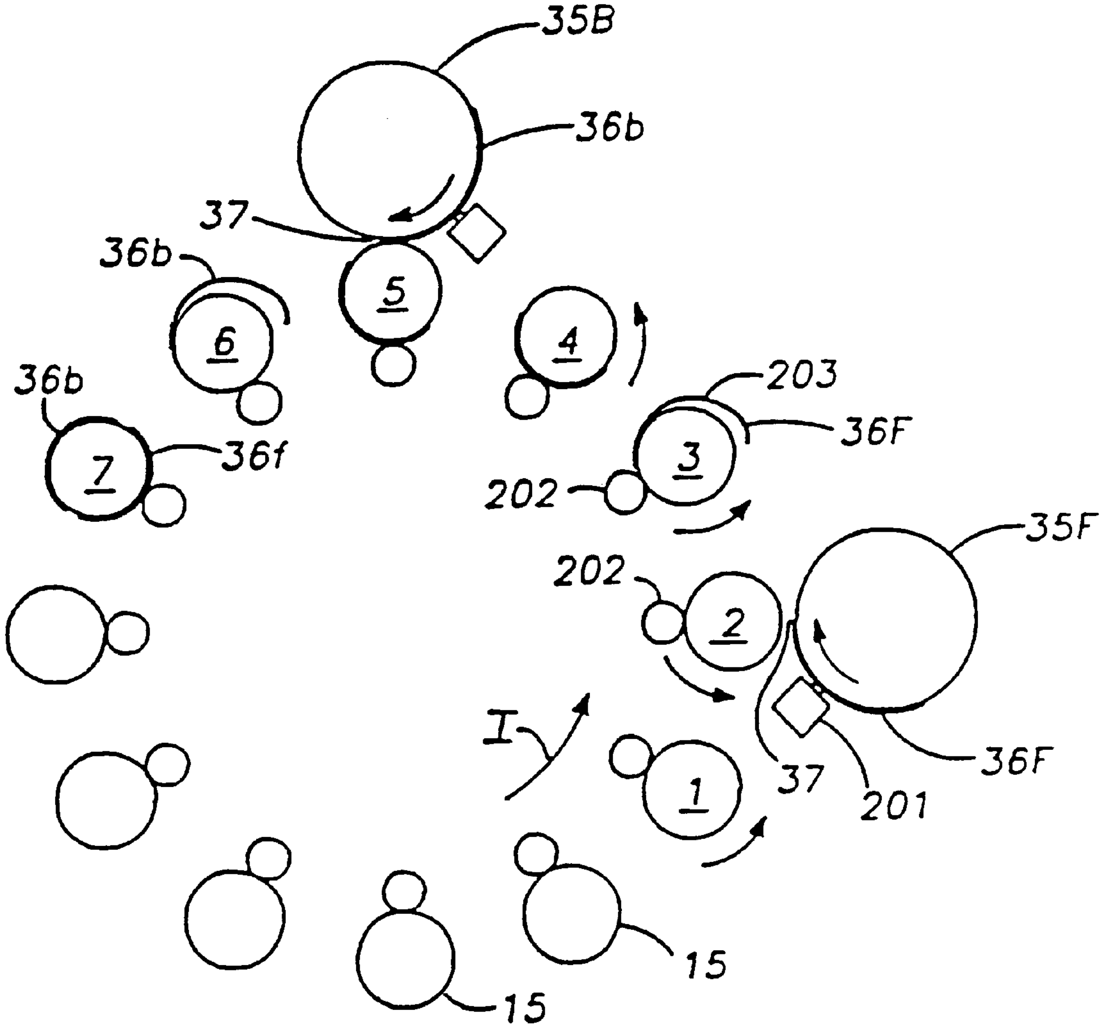
FIG. 3 is an illustration showing a diagrammatic view of another mode of operation in which front and back labeling are carried out.

Referring to FIG. 3, a front and back labeling operation is shown in which container 2 has a front label 36F applied to it by vacuum drum 35F and container 5 has a back label 36B applied to it by a vacuum drum 35B. The apparatus of FIG. 3 is substantially the same as that in FIG. 2 except that a second labeling station is present in addition to the first labeling station. The control system and algorithm is somewhat more complex for a multiple labeling station apparatus, and will be described in more detail subsequently. Assuming that the back label 36B is to be applied at a position 180° from the front label 36F, it will be necessary to change the orientation of the container with respect to the tangent point of the respective vacuum drums 35F and 35B by 180°. Container 4 represents a container at a position between the two labeling stations after the first label has been applied. This 180° spin or change in orientation may be accomplished by any multiple of 180°, e.g. the container may be caused to spin 3×180°,=540°, between the two labeling stations. This operation may be applied to labels which are at some relative angular orientation other than 180° apart, to the application of three or more labels, and to the application of labels to sides of a non-cylindrical container. In all cases the container is caused to rotate between the two labeling stations by the desired amount or a suitable multiple thereof.

In addition to the change in orientation, the container at 5 must also have a velocity so as to minimize slippage when the label 36B is applied as for a single labeling station apparatus. This requirement may readily be achieved as before. However, additional complexity arises when multiple labels are placed on a container. When the relative orientation or location of the two labels is important, both the orientation of the container relative to the vacuum drum 35B, and the velocity of the container must be at the desired values. This matching is achieved in spite of the intermediate acceleration of the container to facilitate label wrapping, and the deceleration necessary to match tangent speed at the vacuum drum 35B. A control mechanism to achieve this operation is described subsequently.

Another aspect of the invention relates to the labeling of containers which are not cylindrical. For example, containers having a rectangular cross-section or an oval cross-section. As for cylindrical containers, either single or multiple labeling may be provided. Chuck rotational speed can be varied during labeling in such a way that each point of the surface of the container, as it is making contact with the applied label, has a suitable speed to match the speed of the incoming label, or slightly different to maintain proper tension.

Figure 4:
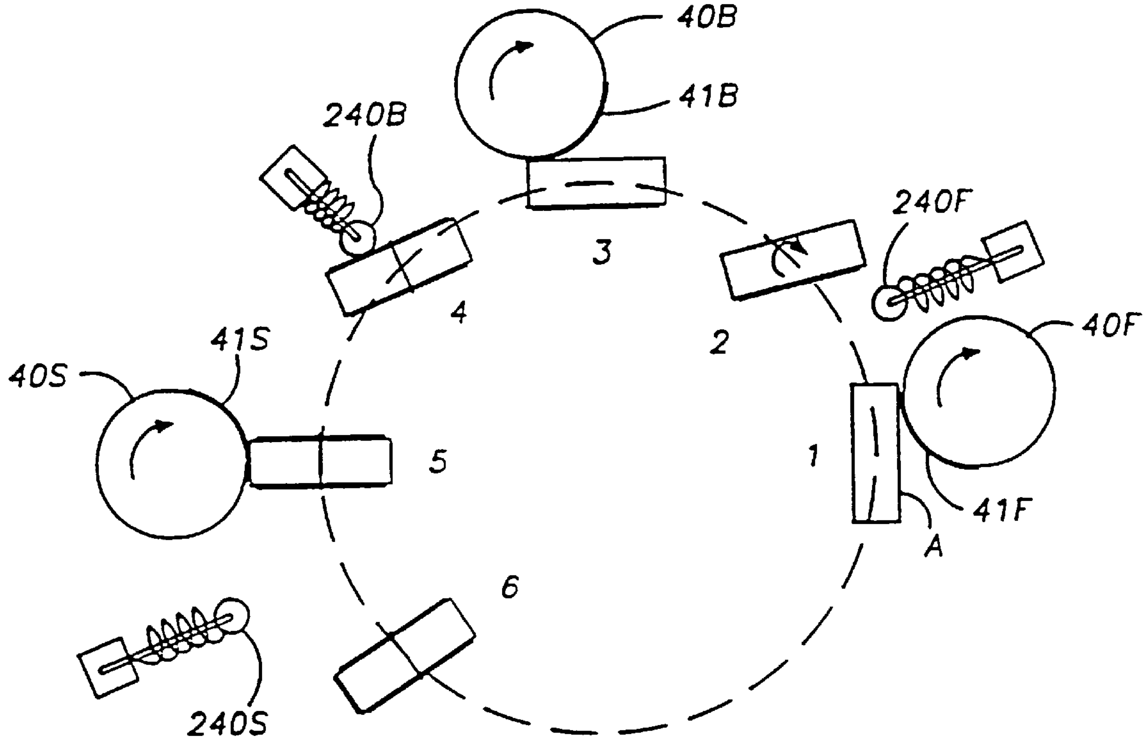
FIG. 4 is an illustration showing a diagrammatic view of a labeling operation carried out by means of the turret of the preferred embodiment for applying front and back labels to containers other than cylindrical containers.

Referring now to FIG. 4, a process is shown for multiple labeling of rectangular containers. The process for labeling rectangular containers is analogous to the process illustrated in FIG. 3 for cylindrical containers but more movements of the container between stations may be required. In FIG. 4, a front, back, and side labeling operation is shown in which a container 1 has a front label 41F applied to it by a vacuum drum 40F, container 3 has a back label 41B applied to it by a vacuum drum 40B, and container 5 has a side label 41S applied to it by a vacuum drum 40S. Assuming that the labels are to be applied on three different faces of the rectangular container, it will be necessary to rotate the container between vacuum drums 40F, 40B, and 40S. Containers 2 and 4 represent containers at intermediate points between labeling operations. Each label application process is completed between the labeling stations and the container is reoriented for the next operation. As for the cylindrical containers, some pressure or force may be required to urge each label with adhesive onto the surface of the container. This urging force may be by some pressure devices as before such as a springably mounted cylindrical roller 240F, 240B, 240S or by, for example, some directed flow of compressed air. The rectangular container may also be spun at a higher velocity between stations but such spinning by itself may be insufficient to adhere the label to the container for a rectangular container under some conditions because of the air flow disruption caused by the irregularly shaped container. When the container shape deviates substantially from a cylinder, it may be desirable to control the orientation of each container at each location as it traverses a turret revolution or more generally as it traverses the predetermined transport path. Steering of the container may be achieved by directing the container against a cylindrical roller 240B, as shown in FIG. 4. To achieve the above and other controls of motions a computer control system driven by computer 20 is provided and is described subsequently.

Referring again to FIG. 1, a perspective view of the computer controlled turret type labeling apparatus 10 of the preferred embodiment is shown. For better clarity in illustrating the function of the present invention, the turret assembly 10 is shown isolated from the remainder of the system. The unloading and loading of a container 15 onto and off of a turret type mechanism is generally known in the art. One method is taught by U.S. Pat. No. 4,108,709, issued to Hoffman. In the preferred embodiment, the turret arrangement 10 is connected through a plurality of control lines to a computer 20 via a plurality of interfaces. The control lines provide communication channels sufficient to sense the position of each sensor 18 and 31 and to excite each motor 17 and 25 either directly or through output drivers to effectuate the desired operation. For example, two or more electrically conductive wires may be provided from each motor and sensor to the computer controller or a multiplexing arrangement or an electrical bus arrangement having fewer wires may be used. Some motors and or sensors may require additional wires or a common ground conductor may be employed to reduce the number of wires needed to communicate. These methods of communication and control are known in the art. The computer 20 is programmed to process signals received from sensors 31 and 18 and to generate appropriate response signals to drive motors 25 and 17 mounted in the turret assembly.

Focusing on the turret 10 assembly, a central turret shaft 11 is provided to turn a turret plate 13. The turret shaft 11 is driven by a motor 25. A drive shaft 26 extends from the motor 25 and is utilized to drive turret shaft 11. The portion of the labeling apparatus containing the motor 25, motor gear 27 and front gear 28, and related components is in the drive motor housing 60. It is separated by a partition 61 from the turret plate 13 and container handling stations 24.

Also located in the drive motor housing 60 is a turret shaft sensor 31. As the turret shaft 11 rotates, the motion of the turret shaft 11 is transferred from turret gear 28 to sensor gear 29. This motion is sensed by sensor 31. The sensor 31 generates a plurality of electrical signals representative of the direction, speed and angular position of the turret shaft 11 in response to the sensed motion and position of shaft 30. For some sensors, the electrical signals generated are pulses which may be coded to represent the direction, speed, and angular position of the shaft. This signal is propagated across control lines 22 and 21 to the computer 20.

A turret plate 13 is coaxially mounted to the turret shaft 11. A plurality of container handling stations 24 are connected to the turret plate 13. Each of these stations 24 contains a motor 17, a rotary shaft 16, a sensor 18 and a container mounting surface (or chuck) 14. The motors 17 are mounted on to the bottom of the turret plate 13 through means well known in the art. The rotary shaft 16 extends from motor 17 through a shaft opening in the turret plate 13. A sensor 18 is connected at the base of the rotary shaft 16 (through a sensing coupling 19) for monitoring the speed, angular position and direction of rotation of rotary shaft 16, and thereby a container 15 located thereon.

In the preferred embodiment, the sensor 18 is a rotary optical encoder. Magnetic flux pick-up type sensors may also be used but may not be as precise as optical devices. Also, some types of motors have an integral position encoder so that a single unit may provide the motor and sensor functions. The optical encoder 18 reads the position of the rotary shaft 16 at a plurality of evenly spaced increments about a complete 360 degree rotation of the rotary shaft 16. For example, an optical encoder having 500 evenly spaced angular increments about a complete 360-degree rotation of the shaft may be used. The greater the number of increments, the greater the precision to which the speed, direction, and angular position may be sensed.

An electrical signal propagating station 23 is mounted on top of the turret plate 13 about drive shaft 11. This station 23 permits continuous electrical signal propagation between lines running from the computer 20 to rotating stations 24 and vice versa. Methods and apparatus for providing the electrical signal propagating station 23 are generally known in the art.

The sensor 18 provides the computer 20 with precise container 15 angular position information at any given instant of time. The location and angular orientation are identified with respect to a fixed point of shaft angular orientation which is precalibrated in the position sensor 18, as discussed above. Given exact container position information, the computer 20 may send out appropriate signals to the motor 17 to move the chuck 14 through a desired motion. These motors 17 may be AC or DC motors depending upon operating conditions, and other relevant considerations. Stepper motors may also be used. The electrical motors 17 rotate the chucks 14 (and containers 15 thereon) at a specific speed, in a specific direction and for a specified duration based upon an excitation signal or control signal provided to motor 17 by the computer 20. A suitable motor for this embodiment is selected based on the characteristics of the chuck 14 and the container 15, and particularly on the required output power, velocity characteristics, torque requirements, and operating environment.

The computer 20 of the preferred embodiment allows an operator to easily modify labeling parameters as opposed to the painstakingly slow process of modifying the mechanical labeling apparatus of the prior art.

A general purpose computer of the type referred to as an IBM compatible computer having sufficient processor speed may be configured with appropriate interfaces to sense and control the labeling apparatus. Methods of control are known in the art and are taught in standard reference texts such as Incremental Motor Control—Volume I—DC Motors and Control Systems edited by Benjamin C. Kuo and Jacob Tal, published by the SRL Publishing Co.

Figure 5:
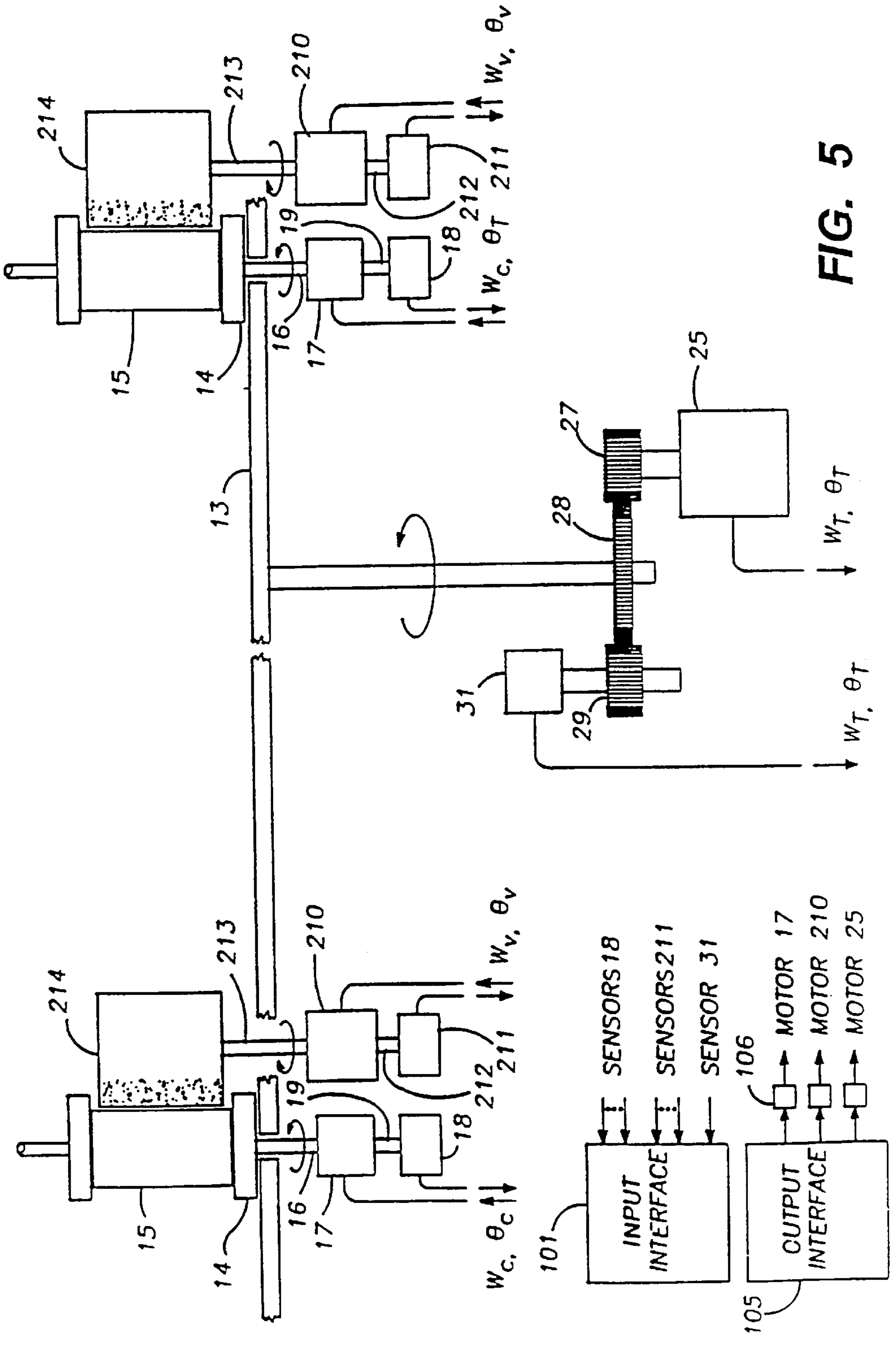
FIG. 5 is an illustration showing a diagrammatic view of selected components such as motors/actuators, sensors, control lines, and interfaces of the computer controlled turret assembly.

Referring to FIG. 5, there is shown an illustration of the components which form part of the computer control system. The components are identified by the same reference numerals as appear in FIG. 1. Of particular interest are turret motor 25, turret sensor 31, a plurality of chuck motors 17, chuck sensors 18, vacuum drum motors 210, and vacuum drum sensors 211.

For each motor 25, 17, 210 there is associated a command signal comprising a commanded angular velocity $\Omega$ and a commanded angular position $\Theta$. For each sensor 31, 18, 211 there is associated a sensor signal comprising a measured angular velocity $\omega$ and a measured angular position $\theta$. The commanded and measured signals are provided or received depending on the characteristics of the particular devices. The commanded and measured angular velocities include both magnitude (speed) and direction.

Figure 6:
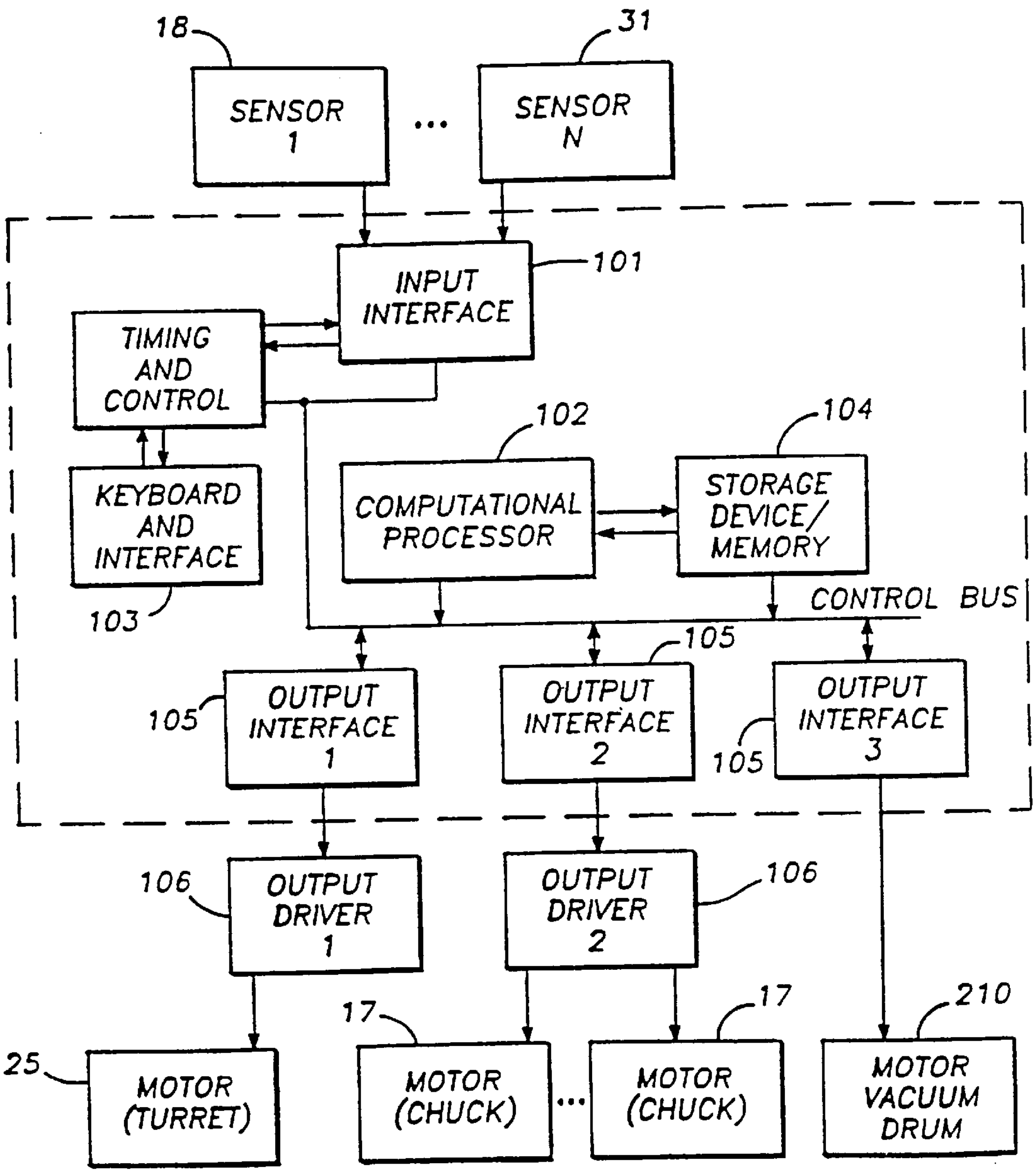
FIG. 6 is an illustration showing a simplified hardware block diagram of the computer, interfaces, actuators/motors, and sensors of the preferred embodiment

Referring to FIG. 6, a simplified hardware diagram of the computer, interfaces, actuators, and sensors of the preferred embodiment is illustrated. Not all aspects of the digital computer, the general structure of which is well known in the art, are illustrated.

Information in the form of electrical signals is input to input interface 101 of computer 20. The interface 101 is comprised of signal conditioning hardware and its operation is under the control of the software process control algorithm and the computer operating system. The interface may comprise analog-to-digital conversion circuitry when the sensors 18 and 31 produce analog signals and a digital computer is used. Signals from other sensors indicating the condition of other components of the labeling apparatus may also be received at the interface. For example, the status of other components of the labeling apparatus may be provided to the interface using suitable sensors. The upper chuck (not shown) position, the vacuum drum status including velocity and angular orientation, and label supply status may be provided, for example. In the interface 101 the input signals may be filtered to suppress noise, processed to identify source sensor, and the data itself may be validated against predetermined characteristics to verify that it is in the proper range and not clearly erroneous.

The input interface 101 may be a parallel interface wherein several signal channels are processed substantially simultaneously, or it may be a serial interface wherein signals are accepted and processed sequentially. Methods of interfacing devices, including sensors, to computers are well known in the art.

After the interface 101 has received the sensor inputs and performed initial processing, the interface provides labeling machine status information to the computer 20 usable by subsequent processing stages. When computer 20 is a digital computer, the status information is generally provided in the form of a plurality of status words, encoded as binary bits. Analog computer control may also be used in which case the status information may be a plurality of voltage levels on different control lines.

The status information is read by a computational processor block 102 which performs logical and arithmetic operations based on the status information, stored parameters form storage device 104, and operator inputs from keyboard 103 when necessary or desirable. The logical and/or arithmetic processing steps or algorithm may be input by an operator from the keyboard 103 or may be retrieved from a storage device 104, such as a computer memory and/or computer disc device. A suitable processing algorithm will define the characteristics of a plurality of control signals based on several system parameters including: the geometry of the turret plate 13 and chucks 14, the sensed position, rotational direction, and speed of the turret plate 13 and chucks 14, a mathematical description of the subject container 15 in a given chuck 14, the dimensions of each label to be applied, the location relative to the container 15 where label is to be applied, a description of the container's motion to achieve the desired labeling, and other parameters related to the characteristics of the overall apparatus as necessary.

The processing algorithm will utilize this information and the specified operation in order to compute appropriate control signals to the various motors 17 and 25 and other components such as the vacuum drum, to achieve the desired operation. The logic and arithmetic processor will also validate the computed control signal parameters to verify that they are not clearly erroneous based on the current status of the apparatus, physical capabilities of the components including motors 17 and 25, and desired operation. Suspect conditions will be indicated by error conditions. In general, some of the computations can be performed and the results pre-stored so that only a minimum number of computations need be performed during operation of the labeling machine.

The control characteristics are provided by a plurality of output status or control words generated under software control in the computational processor 102, and provided to a plurality of output interfaces 105. In most instances, a single output interface 105 will be sufficient, in other instances it may be beneficial to provide more that one interface, such as separate interfaces to control turret motor 25, and chuck motors 17.

The output interface 105 may directly generate the appropriate output analog or digital (pulse) signal based on the information provided by processor 102 to excite motors 17 and 25 to the desired motion. In particular, a commanded speed, direction, and position will be computed for each motor 17 and 25. The output interface 105 may comprise a plurality of digital-to-analog converters to translate the digital control signals into analog electrical signals suitable for the motors 17 and 25. The output interface 105 may also comprise amplification stages. In other instances it may be desirable to interpose an output driver 106 between the interface 105 and the motor 17 and/or 25. The additional output diver is required only when the required motor exciting signal has a larger voltage or current than is possible or desirable to provide directly from the output interface 105, or where the control signal may more effectively be generated external to the computer or its interface. For example, the output driver 106 may be an amplifier, or may be a voltage controlled oscillator which generates a variable frequency pulse signal for a stepper motor. Generally, the output motor signals are analog signals less than a few amperes and fewer than 10 volts; however, the use of motors requiring larger voltage or current signals is within the scope of this invention.

In one embodiment of the invention, direct-current (DC) type motors are employed for motors 17 and 25. In this embodiment the output interface 105, or the optional output driver 106, provide a selectable amplified constant voltage, zero-frequency analog signal to each DC motor.

In an alternative embodiment, altemating-current (AC) type motors are used for motors 17 and 25. In this case, an alternating (non-zero frequency) current or voltage signal is used to excite or control each motor 17 and 25.

In another embodiment of the invention, stepper type motors are used for motors 17 and 25. The signals used to control the motors are pulses, wherein each pulse corresponds to a partial rotation of the motor shaft. Variation in motor velocity may be effectuated by increasing or decreasing the pulse frequency. Acceleration characteristics of the motor may be modified by ramping the pulse frequency in accordance with a desired acceleration ramp characteristic.

Different types of motors may be combined in a single embodiment of the invention as long as the software program controlling the process and the interfaces are configured appropriately.

Upon movement of the turret 13 and chuck 14 in response to the control signals, new sensor signals from sensors 18 and 31 are received at the input interface block 101, beginning the process again. The system is sampled sufficiently frequently to maintain control of operation. The required sampling rate is a function of the dynamics of the system, including the speeds of the turret and chuck motors.

The labeling apparatus is compatible with various types of motors however, the preferred embodiment incorporates stepping motors. Stepping motors are particularly advantageous for this application because the angular velocity and the angular position respond directly to input commands. A stepping motor may be made to move from a known angular position to a commanded angular position by a simple command, such as a sequence of pulses. The velocity may also be commanded in a similar manner. Stepping motors may also be held at a desired angular position by issuing appropriate commands, without additional motor shaft breaking components and without jitter that may occur in servo controlled feedback loop systems without stepper type motors.

The stepper motor is one component of a stepper motor system. The stepper motor control system which activates the proper coil or coils within the motor to make the motor rotor move or stop as desired is important to its operation. The desired motor operation is achieved by energizing selected strator coils in sequence which cause a corresponding movement (or alignment) in the rotor. The controlled acceleration and deceleration of a stepper motor is achieved by ramping or slewing the speed, first with slow step rates and then to higher step rates. When decelerating a stepping motor the high step rate is gradually reduced. For some stepping motors, one pulse causes the motor to move through a fractional part of a full revolution. For a stepper motor having 500 steps in 360 degrees, the motor shaft rotates 360/500=0.72 degrees/step. The speed of such a stepping motor is controlled by the pulse or step frequency. This ramping reduces oscillations and potential loss of synchronism that might result from sudden changes in the pulse frequency. Motor and motor control technology are well known in the mechanical arts.

Figure 7A:
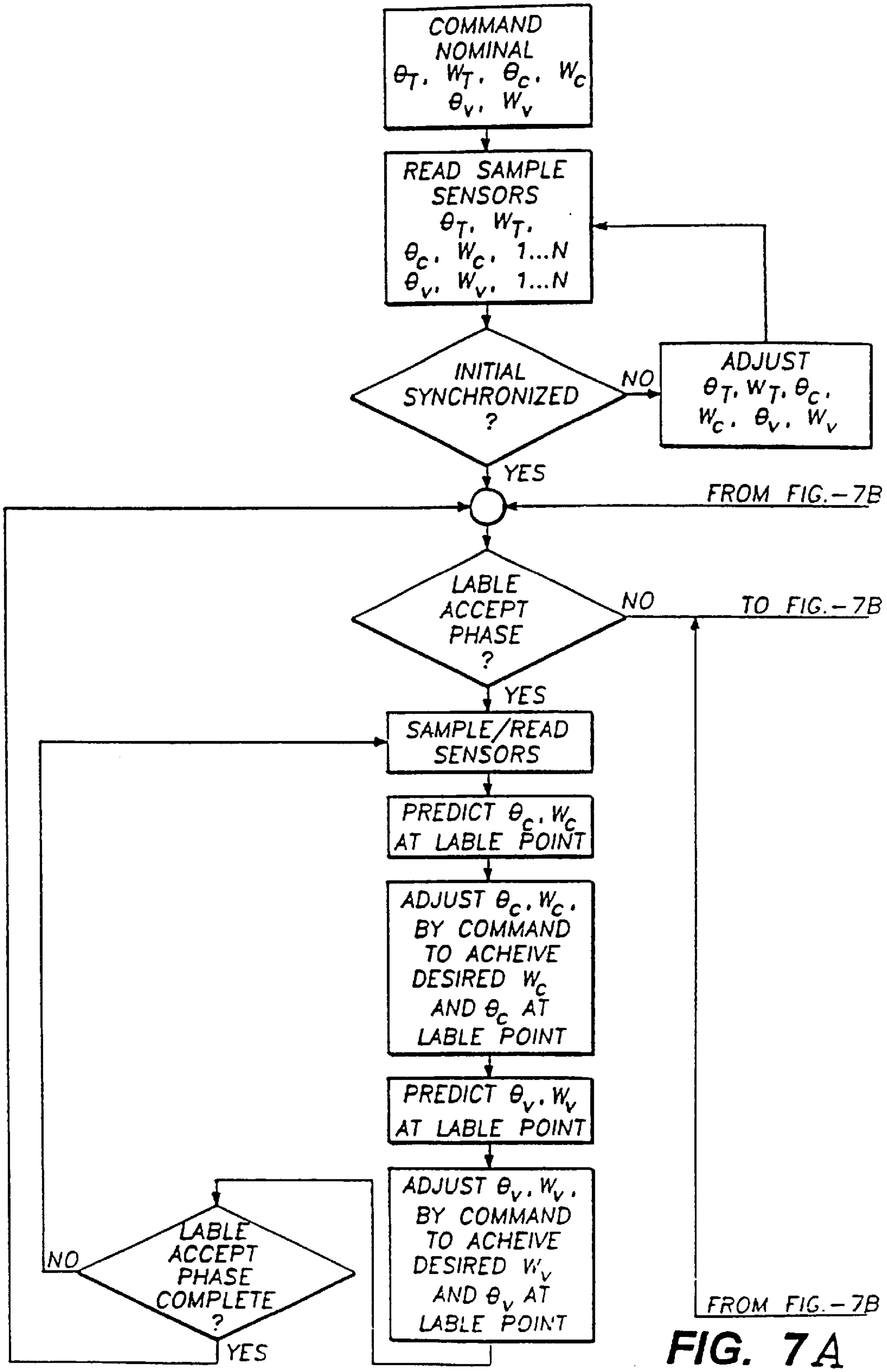
FIGS. 7*a*–7*b* is an illustration showing a flow chart of an algorithm to control the operation of the labeling apparatus.
Figure 7B:
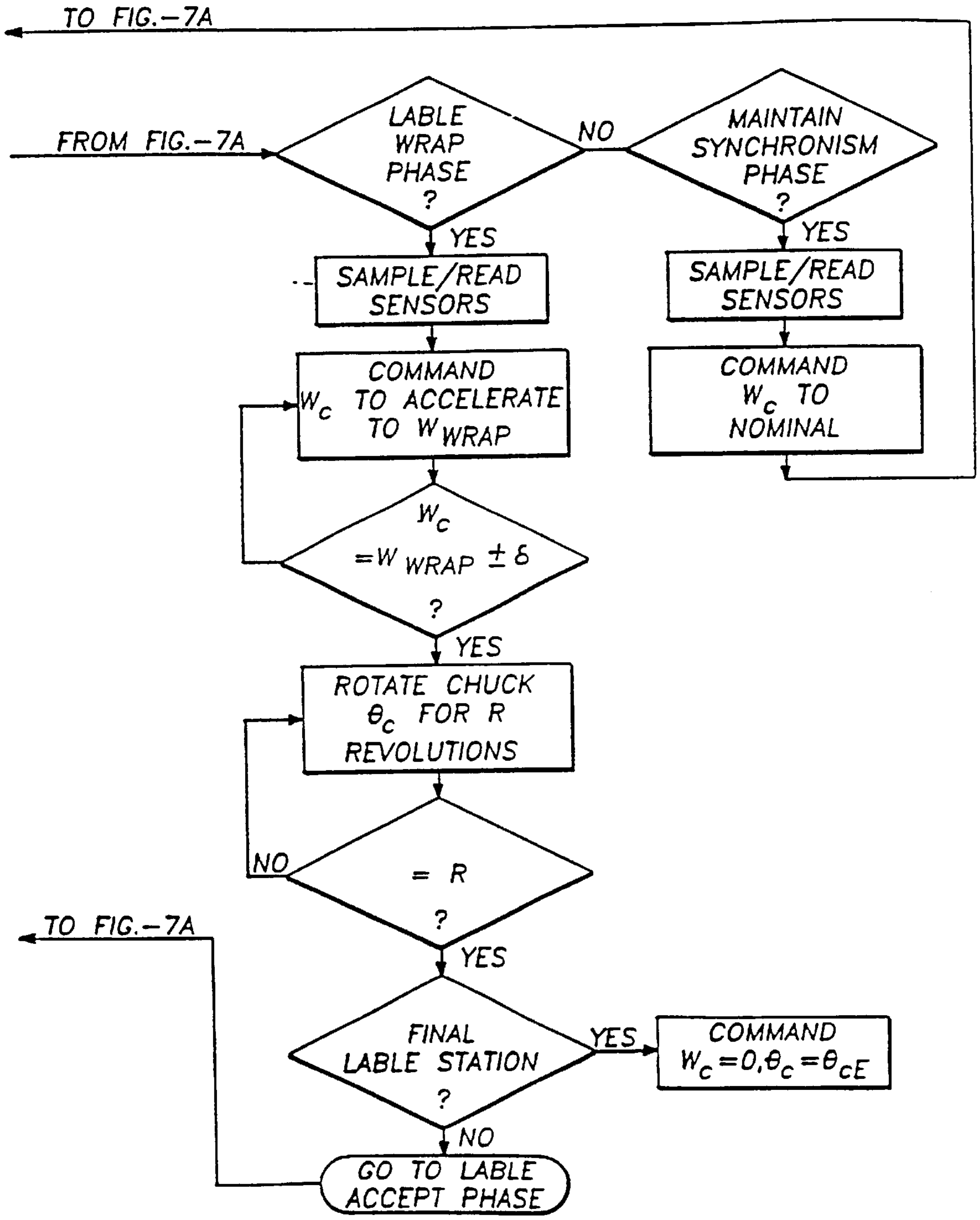

Referring now to FIG. 7, the control system is described in terms of an embodiment of a two labeling station turret type labeling apparatus similar to that illustrated in FIGS. 3 and 5. The flow chart diagram of FIG. 7 illustrates three primary phases of operation. There is an initial synchronization phase during which the control system commands the several motors to operate at or near their nominal velocity values, and to align their shafts to some nominal set of angular orientations. While the initial synchronization step may not be necessary to the operation of the labeling apparatus, its inclusion substantially eliminates the possibility that a characteristic of some component, such as the orientation of a motor shaft, will be incorrect and not correctable in the available time at a critical phase of labeling. Sufficient time is allocated to the initial synchronization phase so as to virtually guarantee synchronization, barring component malfunction.

During the initial synchronization, all of the sensors 18, 31, 211 are read or sampled via the input interface 101. Their values are then evaluated against some standard or nominal parameters and appropriate commands, in the form of number and frequency of pulses are sent to the stepper motors via an output interface 105 and output driver 106. The output driver 106 may comprise the stepper motor controller and operate to translate commands from the computer 20 into an equivalent pulse sequence.

After the initial synchronization, there are three possible phases in which a container 15 mounted to a chuck 14 may be in. Referring to FIG. 3, a container in position 1 is approaching the front labeling station drum 35F. It will be realized that the container positions are part of a continuous movement of the containers around the turret. The chuck motor 17 and the vacuum motor 211 must enter this phase sufficiently prior to tangent contact so that the desired angular speed and orientation can be achieved for all anticipated post-synchronization initial conditions. It is desirable to match angular velocities in order to minimize relative slipping, possible component ware, and label damage. It is desirable to match the angular orientation of the chuck 14 with its oriented container 15 with vacuum drum 35F so that the label is positioned properly on the surface of container 15. For a single labeling station system such as that in FIG. 2, the orientation of the container may not be important if the container is rotationally symmetrical.

The container at location 2 receives the label 36F, and maintains its matching speed until the trailing edge of the label has left the vacuum drum. The label wrap phase may begin at this time. The wrap phase comprises an acceleration of the chuck motor 17 to a desired wrapping velocity. Once this velocity has been achieved, as determined from the chuck sensor 18, the wrapping velocity is maintained for a fixed number of revolutions, or equivalently, for a fixed period of time. A pressure source such as a roller 202, or a linear wiping arm, or a directed stream of compressed air cooperates with the spinning container and unattached trailing label edge to urge it to the container surface. Upon contact the label is secured by the previously applied adhesive. The number of revolutions R, needed to complete the high speed wrapping is predetermined and part of the control program. One complete rotation is sufficient when the pressure device is used; a greater number of revolutions may be necessary to wrap the label absent a pressure device when the wrapping is accomplished by spinning at high speed.

The processing of the container subsequent to wrapping will depend on which label wrapping step has been completed. If the second label step has been completed, such as when the back label 36B has been applied, then the chuck motor 17 may be commanded to decelerate in preparation for the container 15 removal from the turret. If the container is at position 4 in FIG. 3, then it must be prepared for its second labeling operation. As previously described this requires a coordination of angular velocities and orientations to effect substantially slipless labeling and proper placement of the label.

At times other than the label accept phase, the label wrap phase, and the chuck motor deceleration phase, the chuck motor velocity and orientation are not critical and they may generally be commanded to maintain a nominal chuck motor angular velocity. The relative angular orientation during this phase is monitored but need not be corrected. This velocity maintenance phase is generally present prior to the label acceptance phase and between the label accept phase and the label wrap phase. The initiation and completion of the several phases is predetermined based on the characteristics of the container 15 and turret apparatus operating characteristics. The phase must be initiated sufficiently prior to the action to permit the desired velocity and orientation to be achieved.

In an embodiment of the present invention for applying multiple labels to non-cylindrical containers the required control may be somewhat more complex. For example with reference to FIG. 4, a somewhat different control approach may be advantageously used. The rectangular shape of the containers has two impacts on the control system. First, spinning the containers to facilitate wrapping may not be entirely effective because of the potentially unfavorable air currents set up by a spinning nonsymmetrical container. Second, the rectangular container shape defines a different distance from the center of the turret as each container face is presented for labeling. These two differences from a cylindrical labeling apparatus require a more general approach to container orientation than for a cylindrical container but which is also applicable to the cylindrical containers.

Operation of the system is based on controlling the angular orientation of each chuck motor 17 as a function of the relative angular orientation of the turret. In reference to the labeling operation in FIG. 4, a rectangular container is shown at position 1. This container has been orientated by appropriate commands to its chuck motor 17 so as to present a desired location of the desired container face A to the vacuum drum 40F for labeling. While the container at 1 is not spinning in the sense that the cylindrical container was caused to spin, its angular orientation is controlled, such as by rocking (partially rotating) the container toward the vacuum drum 40F at the proper instant to accept the label leading edge 41 F and rocking away from the drum a moment later so as to accept the label without scraping the vacuum drum 40F. The container may be continuously steered so as to clear the vacuum drum 40F. Note that the vacuum drum may not generally be placed at the minimum container tangent point and that different vacuum drums may necessarily be placed at different distances from the turret, or from the centerline of the transport path, to facilitate labeling different container faces.

The ability to continuously steer the container also permits reorientation of the container for a subsequent labeling operation on a different face. For example, in FIG. 4, container 2 is being rotated clockwise so as to present the appropriate face for labeling at vacuum drum 40B.

The steering also permits a pressure device such as spring loaded roller 240B that is illustrated at position 4 to be used to urge the adhesive covered label onto the surface of the container. The orientation of the container may be adjusted as the container passes the pressure application station 240B so that a relatively constant pressure is maintained. Other pressure devices such as a linear wiper arm, a brush, or a stream of directed compressed air may also be used to urge the label to contact the surface of the container.

Stepper type motors are used for chuck motors 17 for this implementation because the stepper motors can be easily commanded to change orientation in step increments. In this embodiment, for each angular orientation of the turret, the chuck motor 17 is commanded to a particular angular orientation. The 360 degree rotation of the turret may be divided into zones having different precision requirements. For each increment of turret position, or for each zone of increments of turret position when appropriate, a desired value of chuck angular orientation and velocity is stored in a memory storage device. This sequence of positions or commands to achieve these positions is stored in memory and is retrieved from memory and issued to the chuck motor 17 at the appropriate time. Some prediction and correction schemes for closed loop control systems may be utilized to minimize the computations when desirable. Methods of implementing predictor/corrector control systems are known in the art. Only one stored sequence of positions is required for all the chuck motors since they all traverse the same sequence of commands at different times. Turret sensor 31 is used to verify turret location at any time, and corrections may be made. Chuck sensors 18 are read to verify that the commanded orientations are achieved. The control of the vacuum drums is substantially the same as for the cylindrical labeling apparatus of FIGS. 3 and 7 relative to the synchronization phase and the label accept phase. Synchronism is then maintained substantially continuously, and the label wrap phase is subsumed into the chuck motor steering as a function of turret angular orientation.

Embodiment for Applying Stretch Labels to Containers

Figure 8:
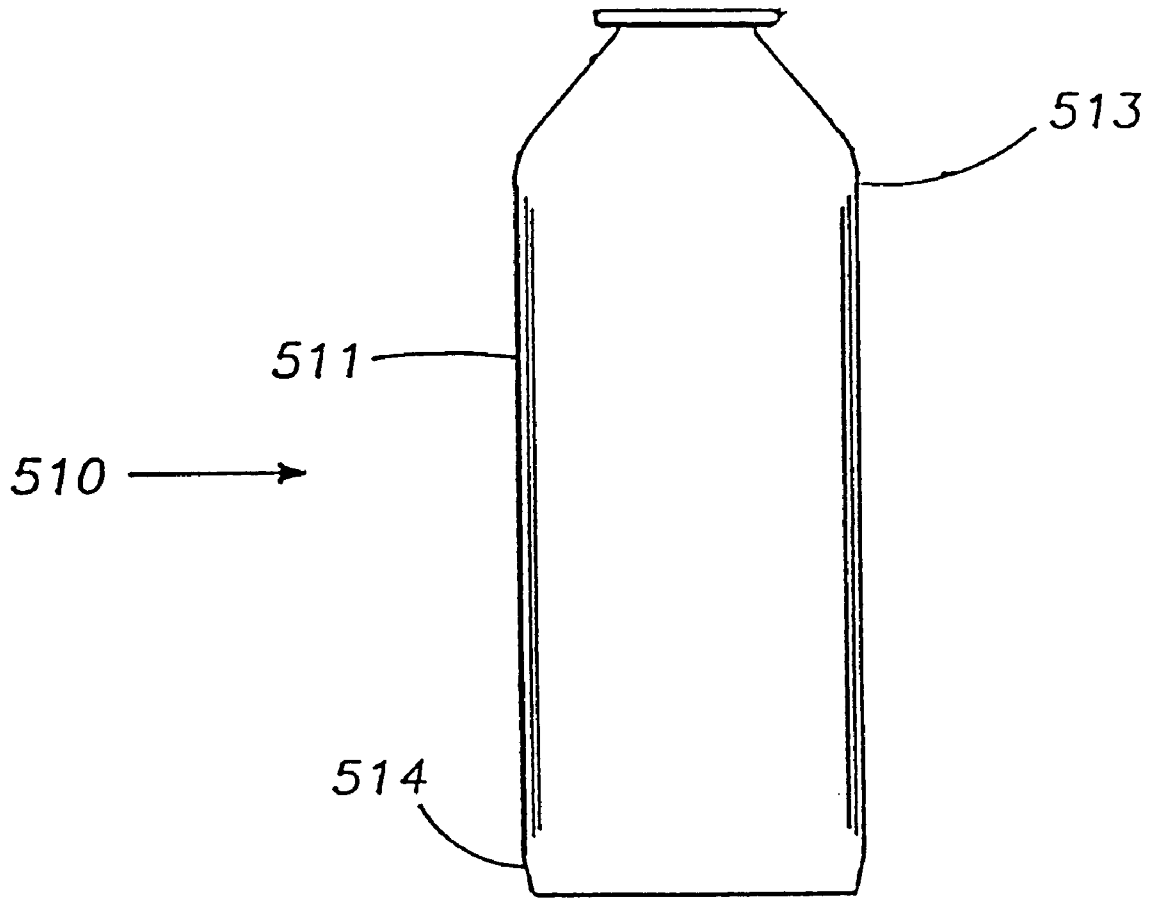
FIG. 8 is a view of a container which can be labeled by the method and with the apparatus of the present invention.

Referring now to FIG. 8, a container is shown at 510 which has a cylindrical body 511, a top 512, a sloping neck or shoulder 513 and a curvature 514 at the bottom. This container is labeled as described below.

Figure 9:
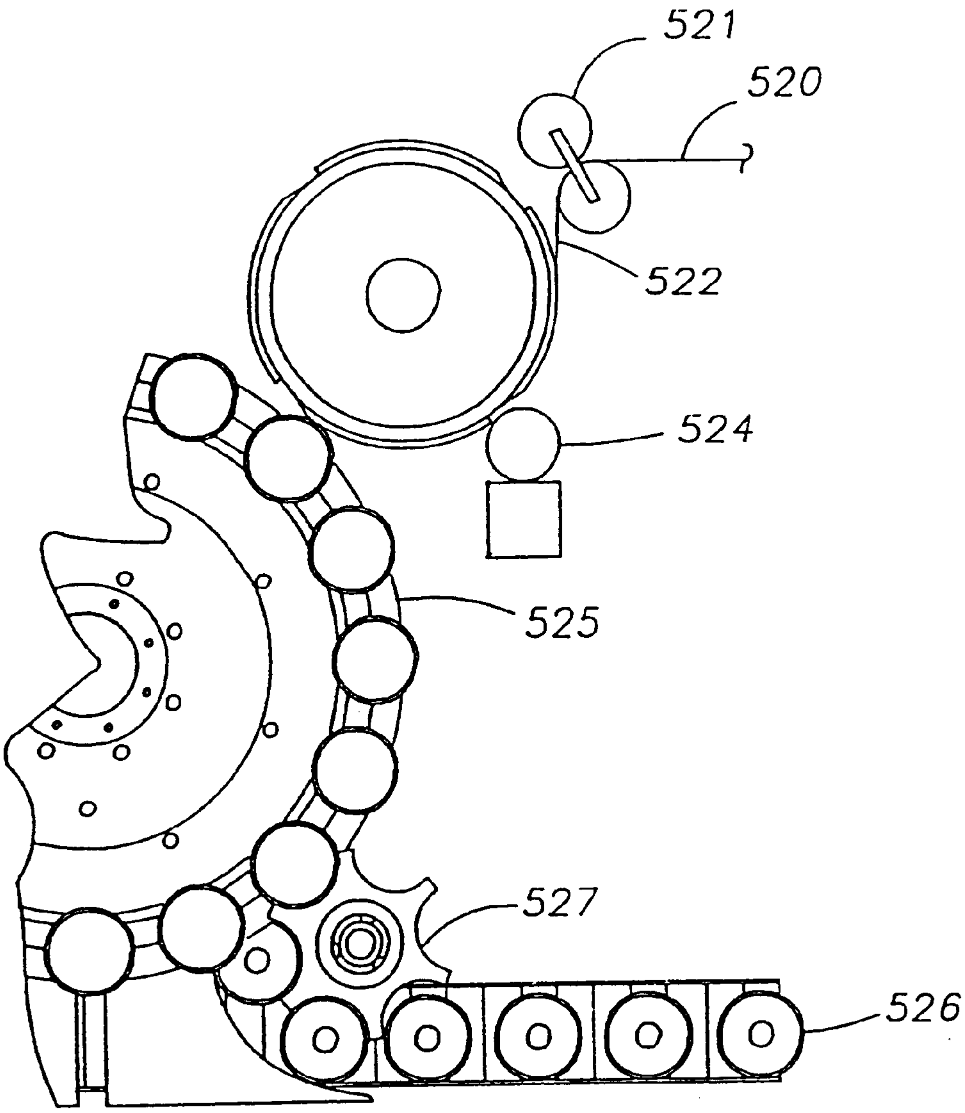
FIG. 9 is a top plan view of a label applying machine suited for use in the present invention.

Referring now to FIG. 9, which is taken from FIG. 1 of U.S. Pat. No. 4,108,709 but is simplified, continuous label stock 520 from a roll of such stock and a label feed (not shown) passes through a cutter 521 which severs the label stock into individual labels 522. Before a label is severed from the label stock, its leading end is delivered to a vacuum drum 523 and, as it is transported by the drum to a container, it has adhesive applied by a glue applicator 524 to its leading end and to its trailing end, or to both its leading and trailing end as described above, a glue pattern being applied as described above. The severed label with adhesive applied to it is delivered to a turret 525 which picks up containers 526 from an infeed star wheel 527. The turret picks up each container in its turn, spins it and transports it past the vacuum drum 523, where it contacts the leading end of a label on the vacuum drum. The vacuum is released at this point of contact so that the label is released and will adhere to and wrap around the container.

As described above, the label is elastic and it is stretched by reason of the fact that the vacuum drum has a peripheral speed exceeding that of the label stock as it is fed to the vacuum drum and the label is prevented from slipping by reason of the vacuum exerted by the vacuum drum 23 and/or by a clamping device as described above or by both such means.

Figure 10:
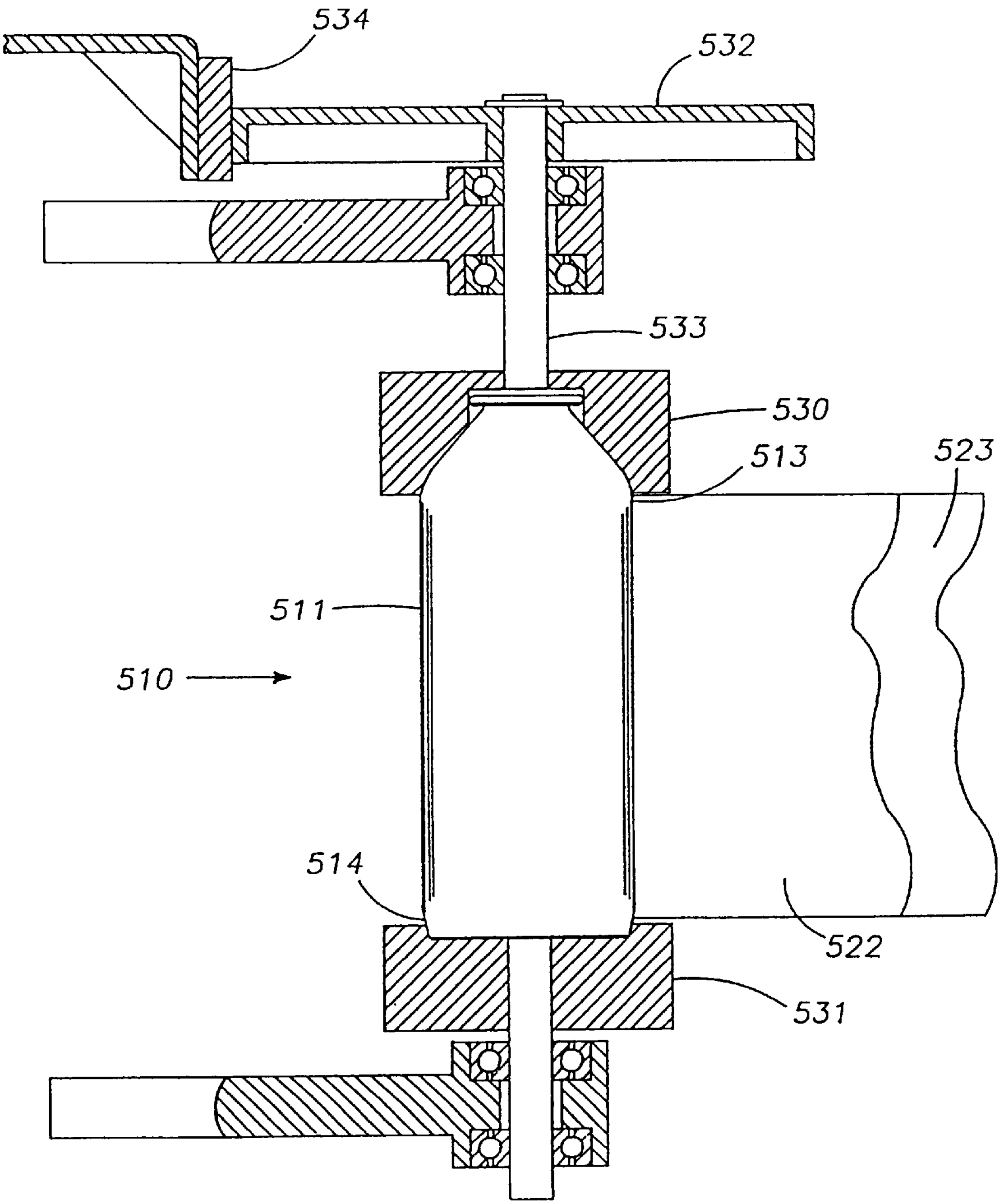
FIG. 10 is a section taken along line 3—3 of FIG. 9.

Referring now to FIG. 10, which is taken from FIG. 2 of U.S. Pat. No. 4,108,709 but is simplified and omits parts and employs different reference numerals, the turret has a number of pairs of chucks 530 and 531 which clamp a container between them. As the turret continues to rotate the upper chuck 530 is caused to spin by a wheel 532 and shaft 533, the wheel 532 being spun by contact with a pad 534 which has a circular arc centered on the axis of the turret. The leading end of the label contacts the container which is spinning and which is also moving about the axis of the turret and vacuum is released so that the label is free to adhere to and move with the container.

To prevent the stretched label from relaxing when it is released by the vacuum drum, adhesive on the label and/or the container acts to hold it on the container in stretched condition. The label is therefore applied to the container in stretched condition. The portion of the label overlying the shoulder 513 will, of course, relax and will conform to the shape of the shoulder and will fit it snugly. Likewise the label will relax and fit onto the curved bottom portion 514 of the container.

Figure 11:
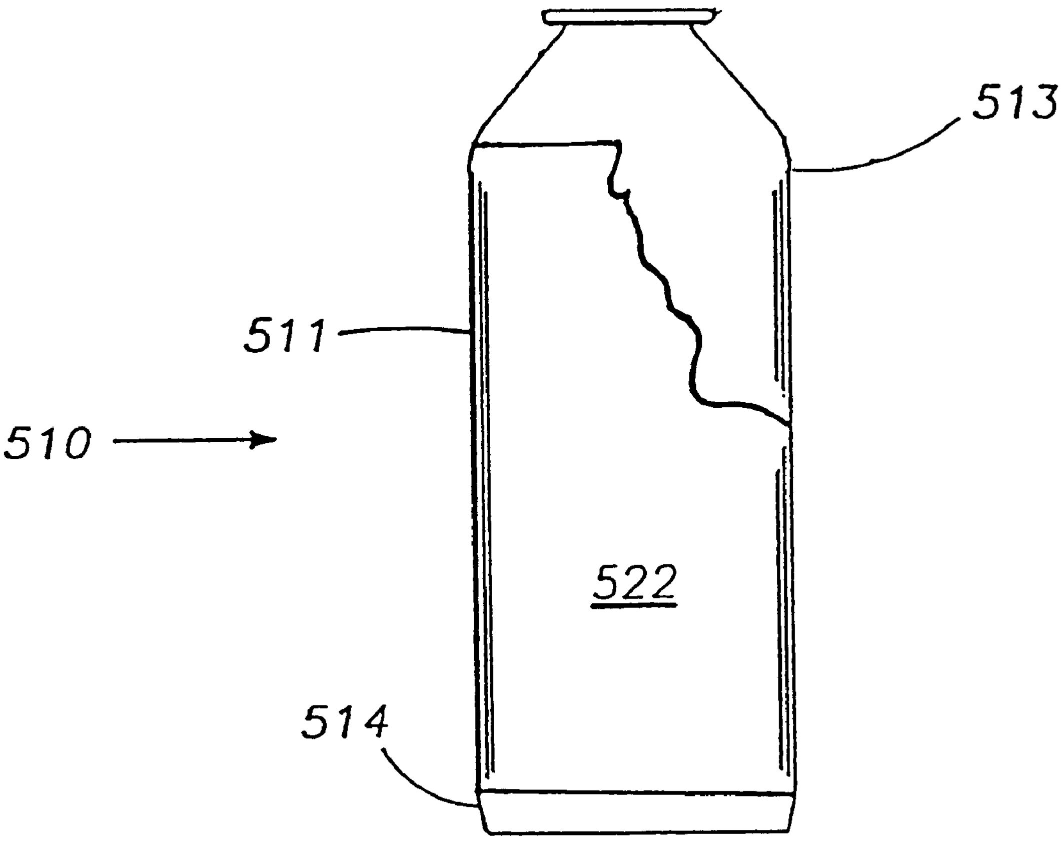
FIG. 11 is a view of the container of FIG. 9 with the label applied thereto.

Referring now to FIG. 11, a labeled container is there shown. The label is applied tightly to the cylindrical body of the container, to the shoulder 513 and to the curved bottom portion 514 of the container.

Figure 12:
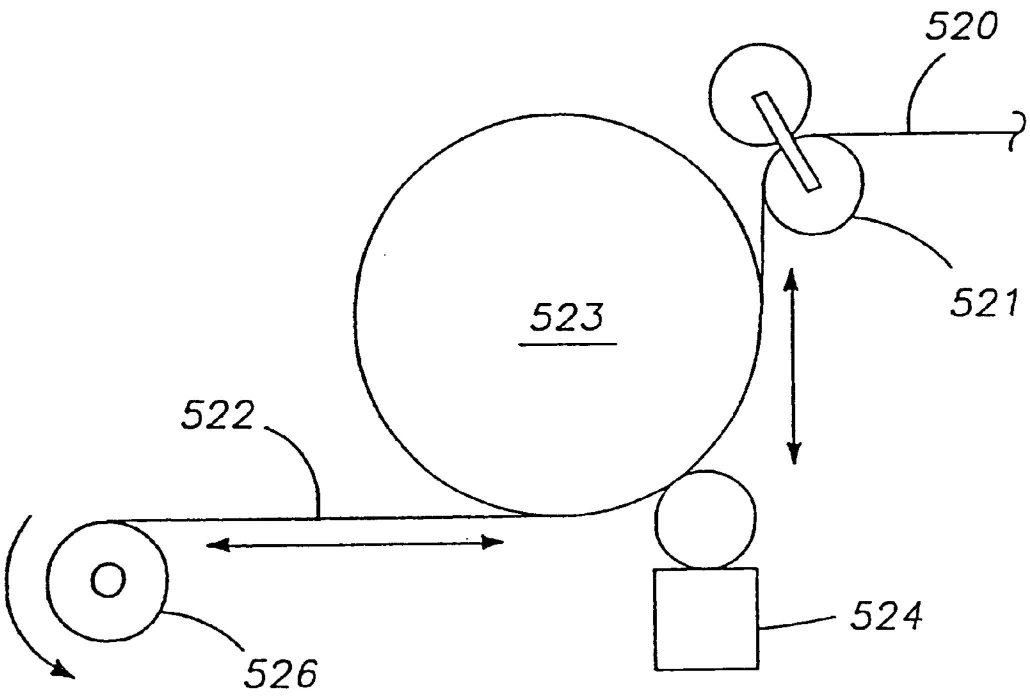
FIG. 12 is a diagrammatic illustration of the method of the invention.

Referring now to FIG. 12, the label cutter 521, the vacuum drum 523, the glue applicator 524, and a container are shown diagrammatically. The double headed arrows indicate the stretching of the label between the label feed and the vacuum drum and between the vacuum drum and the container.

Figure 13:
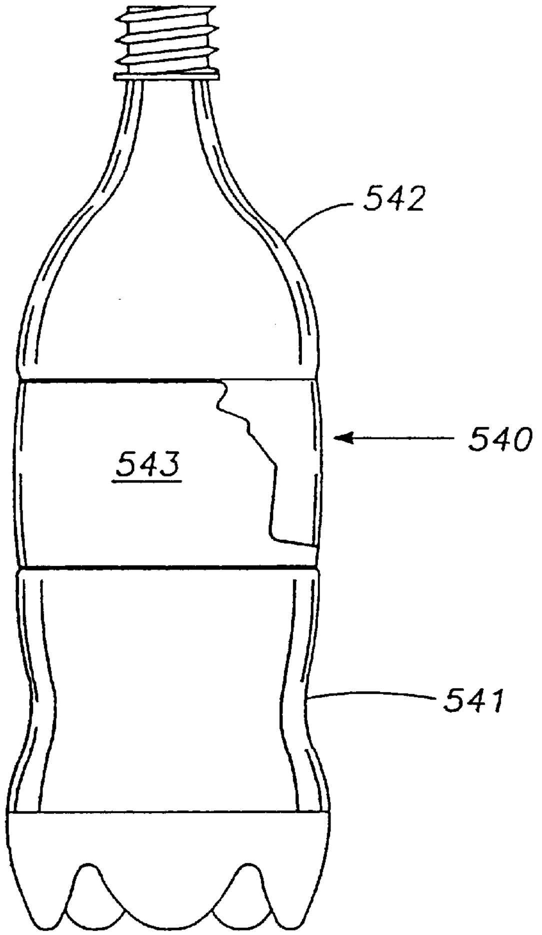
FIGS. 13 and 14 show alternative types of articles to which labels may be applied in accordance with the present invention.

Referring now to FIG. 13, a different kind of container 540 is shown, such having the shape of the familiar Coke bottle. This bottle has a lower body portion 541, an upper inwardly tapering portion 542 and a midportion 543 which is convex. A label 522 is shown applied to this midportion. In U.S. Pat. No. 5,403,416 a heat shrinkable label is applied by adhesive to the zone of maximum diameter of this midportion with its upper and lower parts as yet unattached to the container. These upper and lower portions are then heat shrunk onto the midportion 543.

In accordance with the present invention, the label, shown at 522, is stretched and applied and it conforms to the entire surface of the midportion 543 by relaxing from its stretched condition.

Figure 14:
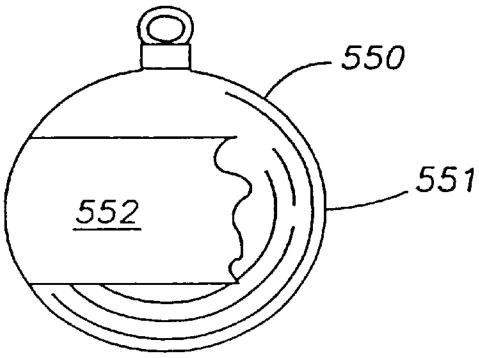

Referring to FIG. 14, another type of labeled article 550 (a Christmas tree omament) is shown which has a convex midportion 551 to which a stretched segment 552 of decorative material has been applied by the apparatus and method described above. The segment 552 fits snugly over the entire convex midportion 551.

Figure 15:
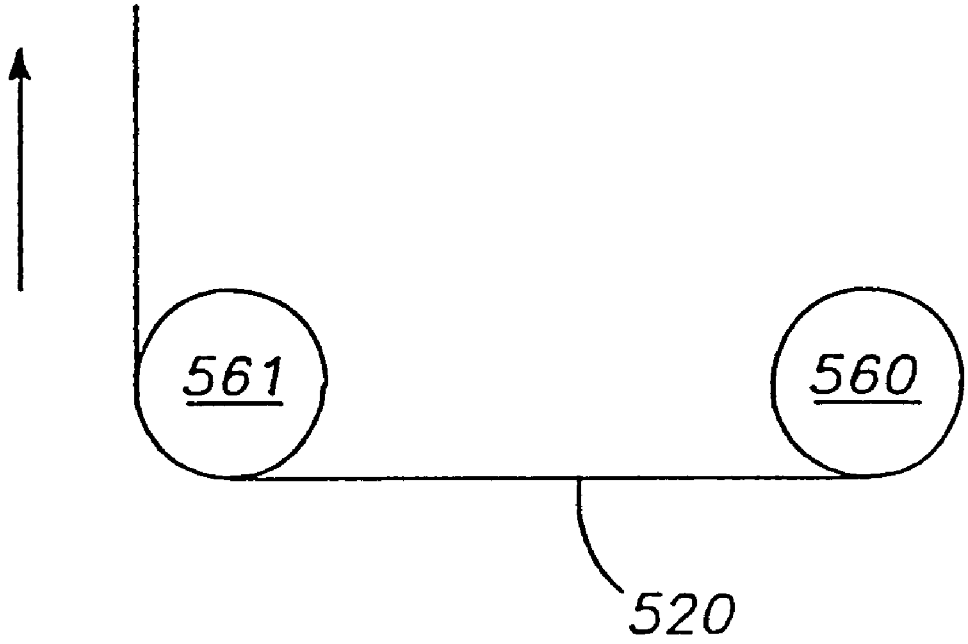
FIG. 15 shows a sequence of label feed rollers which accomplish stretching of the label.

Referring now to FIG. 15, a roll 560 of label stock is shown, such roll being driven by a feed-roll motor (not shown) to feed label material 520 in the direction indicated by the arrow. The label material is partially wrapped around a roller 561 which rotates at a peripheral speed s2 greater than the peripheral speed s1 of the roll 560. Vacuum may be applied to the surface of the roller 561 to prevent slippage of the label material. As a result, the label material is stretched between the roll 560 and the roll 561. The roll 560 may be driven to impart to the label material leaving it a constant speed as the roll diminishes in diameter.

The peripheral speed differential (s2–s1) may be controlled by coupling a sensor to the feed-roll motor to sense its speed and a seperate sensor coupled to a roller drive motor driving roller 561 to sense its speed and inputting both sensed speeds to a computer so that the computer can then maintain a precise speed differential such as by applying appropriate corrective drive control signals to the motors and thereby maintain the label material stretch between predetermined values. Alternatively, one or the other motor may be controlled to spin at a fixed rate, or at a variable rate that results, for example, in a constant peripheral feed rate for the label material. And the other motor, for example the roller drive motor, driven at a peripheral speed faster than the linear speed of the arriving web of label material. In such instance, the drag exerted by the label material as it is stretched from the feedroll is sensed by a torque sensor such as are conventionally known coupled to the driving roller 561 and the speed at which the driving roller motor is drive is adjusted in a feed-back manner to maintain constant torque and a relatively constant amount of label stretch. This latter method may be advantageous over differential speed control alone if lots of the labeling material or even material within the same lot stretches inconsistently.

The moving parts of the machine described above, such as the label feed, the cutter, the vacuum drum, the glue applicator, the turret, chucks and of the roll 560 in FIG. 15 may be operated by means of individual motors which are computer controlled, as for example in U.S. Pat. No. 5,380,381 or in Bright and Otruba U.S. patent application Ser. No. 08/122,857 filed Sep. 16, 1993.

Among other advantages of applying elastic, stretch labels are the following: Elastic labels reduce breakage and fragmentation of containers. If a plastic container is filled with a carbonated beverage and is then sealed it will expand due to the pressure of the carbonation and when it is emptied it will contract. In such a case the elastic label will expand and contract accordingly. An elastic label may be warmed before it is applied, thus allowing it to be stretched more easily.

The drawings and verbal description above have been with respect to articles, each having a body portion of a maximum diameter with one or more portions adjacent thereto and having a lesser diameter. For example, as in the case of containers having cylindrical body portions and at one end an inwardly tapering shoulder, or as in FIG. 14 having spherical bodies. The invention is also applicable to articles such as, for example, a cylindrical bottle or other container having on its cylindrical surface projecting portions to serve as decoration and which stand out from the cylindrical surface. The elastic segments, for example, transparent stretchable label material, may be applied over such projecting portions and onto the cylindrical body of the bottle. For example, the article may have a decorative projection. By the method of the invention, a transparent elastic label may be wrapped around the container in stretched position so as to overlie but not conceal the projecting decoration. The applied label will shrink onto the surrounding cylindrical surface.

It will therefore be apparent that a new and useful machine and a new and useful method have been provided for applying segments of sheet material, e.g. labels, to container and other articles.

Embodiment for Applying Tactilely Sensible Indicia to Containers

Figure 16:
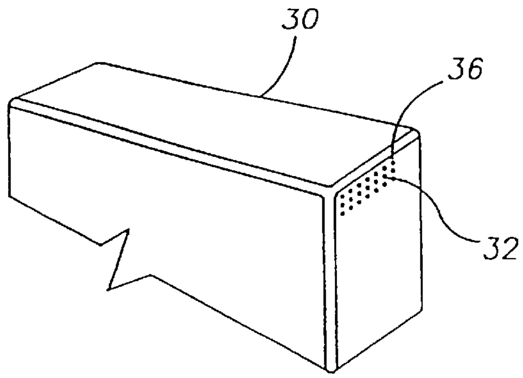
FIG. 16 is a perspective view of an article with braille indicia thereon, marked in accordance with the present invention.
Figure 17:
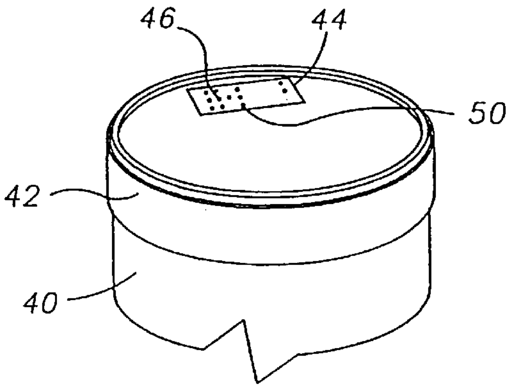
FIG. 17 is a perspective view of a label with braille indica thereon which is secured to a cap or cover of a container.
Figure 18:
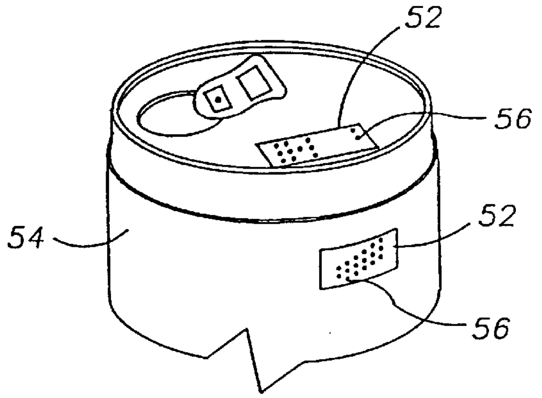
FIG. 18 is a perspective view of a label with braille indicia which has been applied to the top of a beverage container, or alternatively, may be applied to the side of the beverage container.

FIGS. 16–18 show articles having tactilely recognizable indicia thereon to assist visually impaired persons to ascertain information about the respective articles. FIG. 16 shows a cardboard box 30, such as a cereal box, with indicia 32 adhesively secured to box 30. Indicia 32 has individual bumps or ridges 36. Ridges 36 are preferable arranged in a conventional braille lettering format. Altematively, an icon or trademark could be formed on the label as a raised or embossed area which would be perceptible by the visually impaired. A glue spit gun, as will be described later and not shown in FIG. 16, may be used to spit individual gun droplets into the braille lettering format 32. Alternatively, during manufacture of box 30, indicia 32 could be embossed or stamped into box 30. Also, it is possible that indicia 32 could be applied to box 30 by way of a label.

FIG. 17 shows a bottle 40 and cap 42 with a label 44 adhesively secured thereto. Label 44 has an indicia pattern 46 thereon, again including an arrangement of ridges 50. Alternatively, as seen in FIG. 18, a label 52 can be applied to the top or side of a beverage can 54. Label 52 contains tactilely ascertainable information, such as in the form of ridges 56 arranged in a braille configuration.

Figure 19:
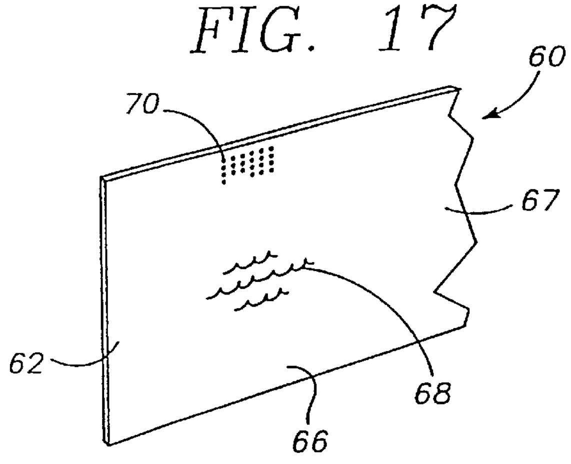
FIG. 19 is a perspective view of a label with braille indicia thereon.

FIG. 19 illustrates a discrete label 60 which is illustrated as rectangular in shape, although other shapes may also be utilized. Label 60 has a leading end portion 62, a trailing and portion 64 and an intermediate portion 66 extending therebetween. Ideally, label 60 has printed matter 68 such as words, photographic reproductions or sketches thereon. Ridges 70 are located on intermediate portion 66. Label 60 is ideally made of a flexible plastic such a polypropylene film or polystyrene film but also may be made of paper or paper laminates. It is preferred that the label material be thin enough to readily produce discernable ridges.

Figure 20:
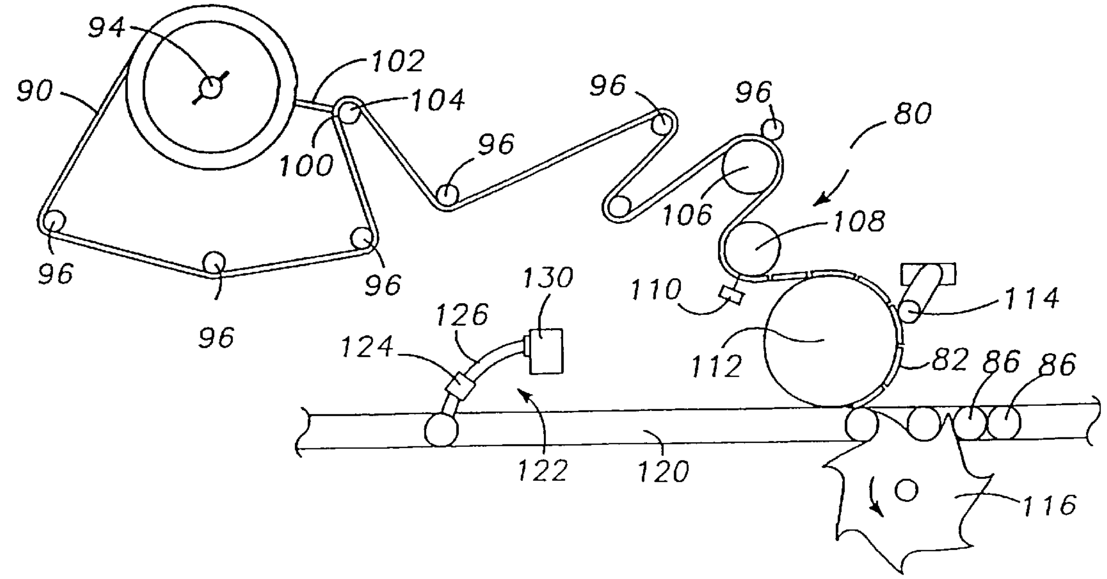
FIG. 20 is a schematic top view of one alternative of a labeling apparatus which applies braille indicia onto labels during attachment of the labels to containers.

FIG. 20 schematically shows a first embodiment of a labeling apparatus 80 used to apply labels 82 on to can 86. Continuous label stock or material 90 is stored on a spool 92 which is pivotally supported by an axle 94. A tensioner mechanism 100, including an arm 102 and a wheel 104, is used to keep stock 90 taut. A drive roller 106, located downstream of spool 92, is rotated against one of the idler wheels 96 to pull stock 90 downstream from wheel 92. A cutter unit 110 periodically cuts continuous stock 90 into labels 82 of predetermined length. A first rotatable vacuum drum 108 applies a vacuum to and holds stock 90 until stock 90 is cut into individual labels 82. Another approach to the cut off step is to first shear the label which is then transferred to the second vacuum drum 112.

Second rotatable vacuum drum 112 holds individual labels 82 using a vacuum. Examples of a vacuum drum releasably holding a label thereto can be found in U.S. Pat. No. 4,242,167, which has been incorporated by reference into this application. The vacuum on the leading edge portion of labels 82 is released when labels move adjacent to vacuum drum 112 thereby providing for the transfer of the label 82 from vacuum drum 108 to vacuum drum 112. As vacuum drum 112 rotates, a glue wheel 114 applies glue on the backside of labels 82, ideally on the leading and trailing edges of labels 82. Vacuum drum 112 holds labels 82 until individual labels 82 are pressed against containers 86. Containers 86 move relative to vacuum drum 112 by a star wheel 116 which receives containers 86 from a conveyor belt 120. The glue on the backside of labels 82 secure labels 82 to containers 86. The labeled containers 86 are then transported by conveyor 120 to a glue spit gun 122.

Figure 21:
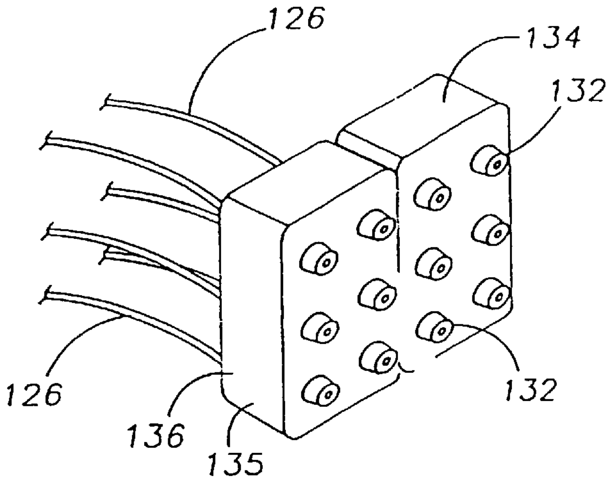
FIG. 21 is a perspective view f a glue spit gun used to apply droplets of glue to a label or container.
Figure 22:
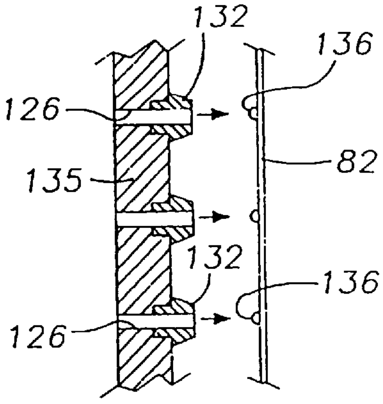
FIG. 22 is a sectional view of the glue spit gun taken generally along line 7—7 of FIG. 21.

Glue spit gun 122 includes a discharge head 124, conduits 126 and a glue supply 130. FIG. 21 shows discharge head 124 in greater detail. Eight individual nozzles 132 are arranged on each of a pair of side by side blocks 134 and 135. Nozzles 132 are supplied with glue from conduits 126. Glue droplets 136 are appropriately sprayed on the outside of labels 82 to form a pair of braille digits or numbers as containers 86 pass by glue spit gun 122. The glue droplets 136 quickly dry on labels 82 to produce tactilely discernable indicia. The glue is preferably a hot melt, a solid thermoplastic material which quickly melts upon heating and then sets to a firm bond on cooling. An example of a glue spit gun is commercially available from J & M Laboratories of Dawsonville, Ga. Alternatively, a thick deposit of ink or any other quick drying liquid medium could be used in place of glue provided that it dried to a tactilely perceptible marking.

Figure 23:
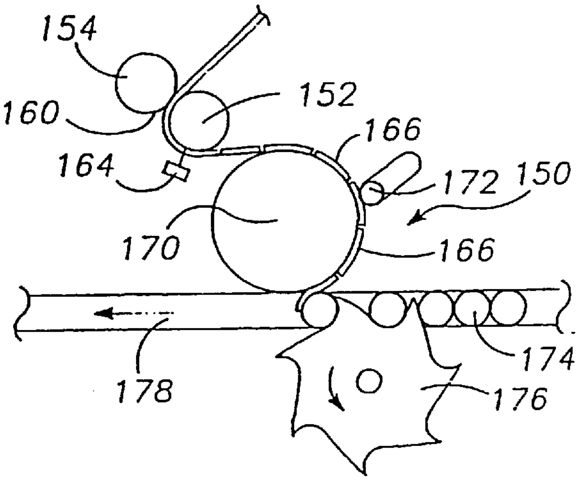
FIG. 23 is a top schematic view of a portion of another embodiment of a labeling apparatus which uses a die to emboss braille indicia onto a label which is then applied to a container.
Figure 24:
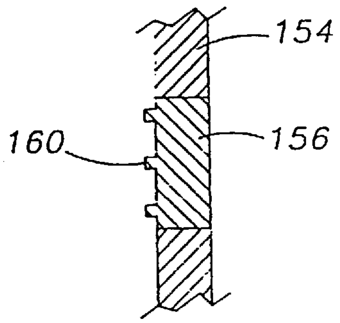
FIG. 24 is a sectional view of the die with projections thereon used in the labeling apparatus of FIG. 23.

FIG. 23 shows a second embodiment of a labeling apparatus 150. Again stock 90 is fed from a spool, not shown. Stock 90 is threaded between a pair of rollers 152 and 154. Roller 154, as shown in FIG. 24, includes a male die insert 156 held thereon which includes a predetermined pattern of projections 160 which are arranged in a predetermined braille lettering pattern. As rollers 152 and 154 rotate, they emboss in stock 90 a braille pattern of ridges corresponding to projections 160. Ideally, roller 152 is a hardened back-up roller. However, it should be appreciated that it may be necessary to utilize a soft back-up roller or a corresponding female die to maintain character integrity.

A cutter assembly 164, located adjacent roller 152, cuts appropriately sized labels 166 from stock 90. Roller 152 is a vacuum drum which applies a vacuum to hold stock 90 thereagainst while label 166 is cut. Each individual label 166 carries the embossed braille pattern thereon. The cutter assembly 164 and die insert 156 are in registry with one another as die rollers 152 and 154 are rotated so that the braille pattern and any printed matter on labels 166 are appropriately located relative to the leading and trailing edge portions on labels 166.

Figure 25:
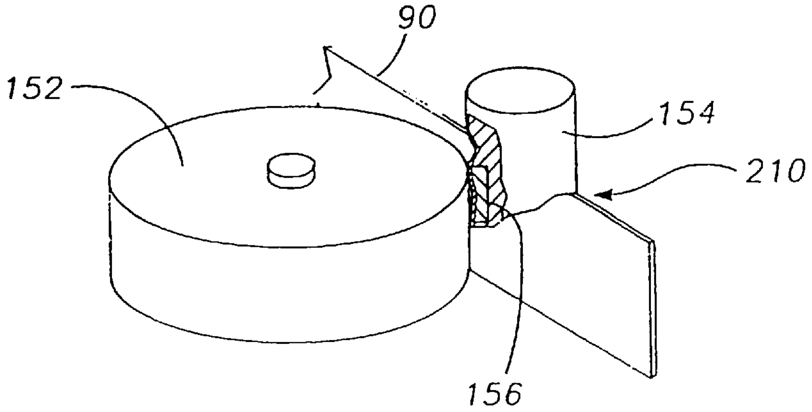
FIG. 25 is a perspective view of a label being roll formed between a vacuum drum and a roller.

Labels 166, after they are cut, are passed onto a large vacuum drum 170 and are pressed against a glue wheel 172. Glue wheel 172 applies glue to the leading and trailing edges of labels 16 without damaging the embossed braille pattern in the labels 166. Labels 166 are then transported to mate against containers 174 carried by a star wheel 176. The glue on labels 166 affix to containers 174 and the vacuum applied by vacuum drum 170 to labels 166 adjacent star wheel 176 is removed allowing labels 166 to attach to containers 174. Containers 174 are carried to and from star wheel 176 by a conveyor 178. With labeling apparatus 150, the braille ridges project outwardly from containers 174. Alternatively, it is possible to arrange a roller with dies on the opposite side of the labels so as to produce indentations on the labels after they are affixed to the containers. FIG. 25 shows rollers 152 and 154 in perspective embossing a label 90 passing therebetween.

Figure 26:
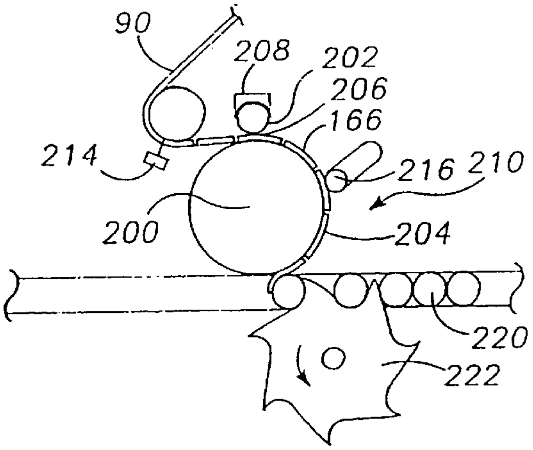
FIG. 26 is a top schematic view of another embodiment of a labeling apparatus used to place braille indicia in labels which are subsequently applied to containers.

FIG. 26 illustrates a vacuum drum 200 and glue mating wheel 202 used in a third embodiment of labeling apparatus 210. As a label 204 is transported upon vacuum drum 200, a glue wheel 202 applies a prearranged pattern of glue droplets upon labels 204. Roller 202 has projections 206 located thereon which picks up glue from a reservoir 208 prior to transferring the glue to labels 204.

Stock 90, preferably with printed matter thereon, is fed around roller 212 which utilizes a vacuum to hold stock 90. A cutter apparatus 214 cuts individual labels 204 from stock 90. As labels 204 are cut, these labels 204 are held on vacuum drum 200 by vacuum. When labels 204 pass between vacuum drum 200 and roller 202, tactilely discernible braille indicia in the form of glue droplets are formed on to labels 204. A glue wheel 216 applies glue onto the backside of labels 204. Labels 204 are then carried to and are pressed upon cans 220 with the vacuum from vacuum drum 200 being removed from labels 204 at this point with the glue holding the respective labels 204 to containers 220. Again a star wheel 222 and a conveyor 224 are used to transport containers 220 to and from vacuum drum 200.

Figure 27:
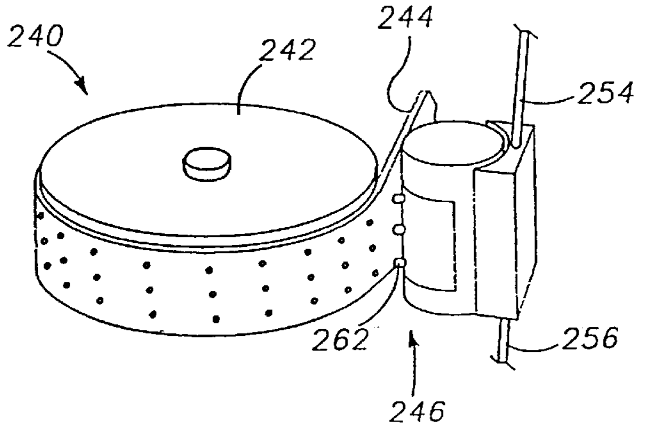
FIG. 27 is a perspective schematic view of another labeling apparatus embodiment in which a label, secured to a vacuum drum and passing adjacent a glue spit gun, receives droplets of glue.
Figure 28:
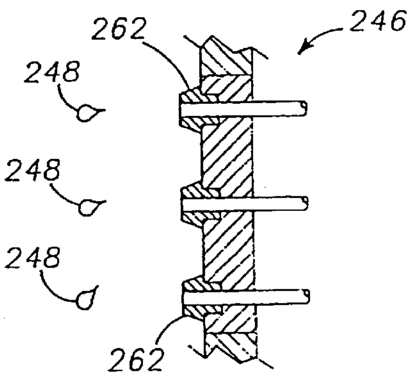
FIG. 28 is a fragmentary sectional view taken through the glue spit gun of FIG. 27.

A portion of a third embodiment of a labeling apparatus 240 is schematically depicted in FIG. 27. Again, a vacuum drum 242 is used to hold a label 24. A glue spit gun 246 spits droplets 248 of glue onto the backside of label 244 or the side opposite vacuum drum 242. Vacuum drum 242 and spit gun 246 would replace respective vacuum drum 200 and glue wheel 202 of apparatus 210 of FIG. 26.

Figure 29:
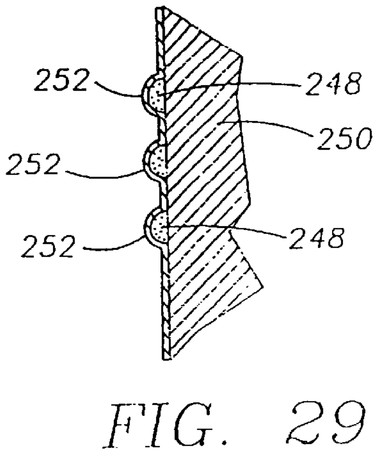
FIG. 29 is a sectional view of a label having glue droplets located on the underside thereof which has been applied to a container producing tactilely identifiable ridges on the label.

When label 244 is pressed upon a container 250, droplets 248 of glue cause ridges 252 to form in label 244 as seen in FIG. 29. By applying the glue droplets 248 in a braille lettering configuration, label 244 becomes tactilely readable by a visually impaired person. Also, rather than using separate glue wheel in low production applications, spit gun 246 could be used to apply glue to the leading and trailing edge portions of labels 244 along with applying droplets 248.

Glue spit gun 246 includes a supply conduit 254 and a drain conduit 256. A reservoir 260 holds molten glue therein under pressure. Nozzles 262 spray droplets 248 onto label 244. A computer controller 270 controls the timing and pattern of the sputtering of the glue droplets from spit gun 246 onto labels 244.

Figure 30:
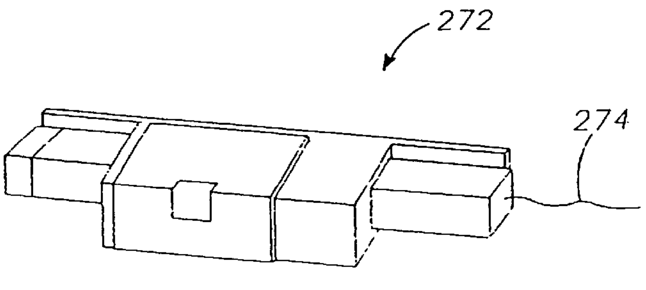
FIG. 30 is a perspective view of a glue application apparatus designed to emit glue in a spiral pattern.

The preferred labeling apparatus is the Nordson Controller Fiberization System 272 as shown in FIG. 30, wherein the nozzle design causes air and streams of glue to be readily controllable. The Nordson Controlled Fiberization process uses multiple streams of air directed to the glue, as it is delivered by the nozzle, whereby the glue is cooled and formed into a spiral pattern 274 by the multiple air streams. The Nordson system thus allows for increased control of glue placement.

Again, the Nordson Controlled Fiberization System 272 would replace the glue wheel 202 and spit gun 246 of FIGS. 26 and 27. The Nordson Controlled Fiberization System emits droplets of glue unto the backside of label 244, held by the vacuum drum 242.

The Nordson Controlled Fiberization System 272 is the preferred labeling apparatus in large part because of its exceptional control of glue placement. Additionally, because the reduced temperature of the glue minimizes heat distortion of the labels during the glue application process without compromising production speeds.

While in the foregoing specification this invention has been described in relation to certain preferred embodiments thereof, and many details have been set forth for the purpose of illustration, it will be apparent to those skilled in the art that the invention is susceptible to alteration and that certain other details described herein can vary considerably without departing from the basic principles of the invention. For example, a glue gun can be used to label containers such as those depicted in FIGS. 16–18 as they are passed down a conveyor line. Further, it is envisioned that a concentrated air pattern emitted from a computer controlled air gun, similar to glue guns 122 and 246, could be used to impart deformations to a label producing a tactilely identifiable indicia pattern.

The foregoing descriptions of specific embodiments of the present invention have been presented for purposes of illustration and description. They are not intended to be exhaustive orto limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be designed by the claims appended hereto and their equivalents.

What is claimed is:

1. An article labeled by a labeling machine comprising:

an article;

a label composed of stretchable material applied by the labeling machine to said article as the article is fed through the labeling machine, said label having an interior surface matingly engaged with said article after application of said label and an exterior surface exposed after application of said label to said article by the labeling machine; and a tactile distinguishable marking comprising a plurality of raised portions applied to said label by the labeling machine as said label is feeding through the labeling machine, said tactile distinguishable marking providing visually impaired consumers of said article with information about the article.

2. The article in claim 1, wherein said article is a container.

3. The article in claim 2 wherein said article has an arbitrary peripheral surface shape.

4. The article in claim 3 wherein said arbitrary peripheral shape is a non-cylindrical shape.

5. The article in claim 1 wherein the stretchable label material is heat shrinkable.

* * * * *